(12) United States Patent
Wu et al.

(10) Patent No.: US 11,720,192 B2
(45) Date of Patent: Aug. 8, 2023

(54) DISPLAY PANEL AND DISPLAY APPARATUS

(71) Applicant: Wuhan Tianma Micro-Electronics Co., Ltd., Wuhan (CN)

(72) Inventors: Huangyao Wu, Xiamen (CN); Hongbo Zhou, Xiamen (CN); Xiufeng Zhou, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 17/643,015

(22) Filed: Dec. 7, 2021

(65) Prior Publication Data
US 2023/0115848 A1  Apr. 13, 2023

(30) Foreign Application Priority Data
Oct. 9, 2021  (CN) .......................... 202111178365.X

(51) Int. Cl.
*G06F 3/041*  (2006.01)

(52) U.S. Cl.
CPC .......... *G06F 3/0412* (2013.01); *G06F 3/0416* (2013.01); *G06F 2203/04111* (2013.01)

(58) Field of Classification Search
CPC ................. G06F 3/0412; G06F 3/0416; G06F 2203/04111
See application file for complete search history.

(56) References Cited

U.S. PATENT DOCUMENTS

| | | | | |
|---|---|---|---|---|
| 2018/0335874 A1* | 11/2018 | Li | ............................ | G06F 3/047 |
| 2020/0133435 A1* | 4/2020 | Liu | ........................ | G06F 3/0412 |
| 2020/0387686 A1* | 12/2020 | Jhang | ...................... | G06F 21/32 |
| 2021/0240303 A1* | 8/2021 | Blondin | ................ | G06F 3/0445 |
| 2022/0187952 A1* | 6/2022 | Lin | ........................ | G06F 3/0412 |
| 2022/0197463 A1* | 6/2022 | Li | .......................... | G06F 3/0443 |

FOREIGN PATENT DOCUMENTS

CN  111665986 A  9/2020

\* cited by examiner

*Primary Examiner* — Ryan A Lubit
(74) *Attorney, Agent, or Firm* — Anova Law Group PLLC

(57) ABSTRACT

A display panel and a display apparatus are provided in the present disclosure. The display panel includes a substrate, a display device disposed on the substrate, and a touch control device, disposed on a side of the display device away from the substrate. The touch control device includes a bridge layer, an insulation layer, and a touch control electrode layer; the bridge layer includes a plurality of bridge electrodes; and the touch control electrode layer includes touch control electrodes. A touch control electrode includes a touch control electrode portion, where along a direction perpendicular to a plane of the display panel, the touch control electrode portion at least partially overlaps a bridge electrode. The touch control electrode portion includes a plurality of touch control metal portions formed in a metal grid shape and electrically connected with each other; and the bridge electrode includes a plurality of bridge metal portions.

19 Claims, 16 Drawing Sheets

DISPLAY PANEL AND DISPLAY APPARATUS

CROSS-REFERENCE TO RELATED APPLICATION

This application claims the priority of Chinese Patent Application No. 202111178365.X, filed on Oct. 9, 2021, the content of which is incorporated herein by reference in its entirety.

TECHNICAL FIELD

The present disclosure generally relates to the field of display technology and, more particularly, relates to a display panel and a display apparatus.

BACKGROUND

Touch screen technology has gradually replaced push-button technology as the mainstream technology for mobile terminals and the like. Touch screen technology is a technology that determines input information by detecting the touched position (in the form of coordinates) which is sent to a controller when a finger, pen and the like touches the touch screen installed on the front end of a display apparatus. Currently, the application range of touch screens is extremely broad. The main products include mobile terminals such as touch-sensitive mobile phones, notebook computers, and man-machine display interfaces in the industrial automation industry.

In order to realize the touch function of the display apparatus, it is normally necessary to introduce touch control electrodes in the display apparatus. The touch control electrodes include two cross-sectional horizontal and vertical parts. Due to process reasons, metal residues are easily generated in the touch control electrodes, which may affect the product yield.

SUMMARY

One aspect of the present disclosure provides a display panel. The display panel includes a substrate, a display device disposed on the substrate, and a touch control device disposed on a side of the display device away from the substrate. The touch control device includes a bridge layer, an insulation layer, and a touch control electrode layer, which are sequentially stacked along a light exiting direction of the display panel; the bridge layer includes a plurality of bridge electrodes; the touch control electrode layer includes touch control electrodes arranged along a first direction or a second direction; and the second direction intersects the first direction. A touch control electrode includes a touch control electrode portion, where along a direction perpendicular to a plane of the display panel, the touch control electrode portion at least partially overlaps a bridge electrode. The touch control electrode portion includes a plurality of touch control metal portions formed in a metal grid shape and electrically connected with each other; the bridge electrode includes a plurality of bridge metal portions; and along the direction perpendicular to the plane of the display panel, at least a part of a touch control metal portion covers at least a part of a bridge metal portion extending along a same direction as the part of the touch control metal portion.

Another aspect of the present disclosure provides a display apparatus including a display panel. The display panel includes a substrate, a display device disposed on the substrate, and a touch control device disposed on a side of the display device away from the substrate. The touch control device includes a bridge layer, an insulation layer, and a touch control electrode layer, which are sequentially stacked along a light exiting direction of the display panel; the bridge layer includes a plurality of bridge electrodes; the touch control electrode layer includes touch control electrodes arranged along a first direction or a second direction; and the second direction intersects the first direction. A touch control electrode includes a touch control electrode portion, where along a direction perpendicular to a plane of the display panel, the touch control electrode portion at least partially overlaps a bridge electrode. The touch control electrode portion includes a plurality of touch control metal portions formed in a metal grid shape and electrically connected with each other; the bridge electrode includes a plurality of bridge metal portions; and along the direction perpendicular to the plane of the display panel, at least a part of a touch control metal portion covers at least a part of a bridge metal portion extending along a same direction as the part of the touch control metal portion.

Other aspects of the present disclosure can be understood by those skilled in the art in light of the description, the claims, and the drawings of the present disclosure.

BRIEF DESCRIPTION OF THE DRAWINGS

By reading the following detailed description of the non-limiting embodiments with reference to the accompanying drawings, other features, objectives and advantages of the present disclosure become more apparent, where same or similar reference signs indicate same or similar features.

DETAILED DESCRIPTION

Figure 1:
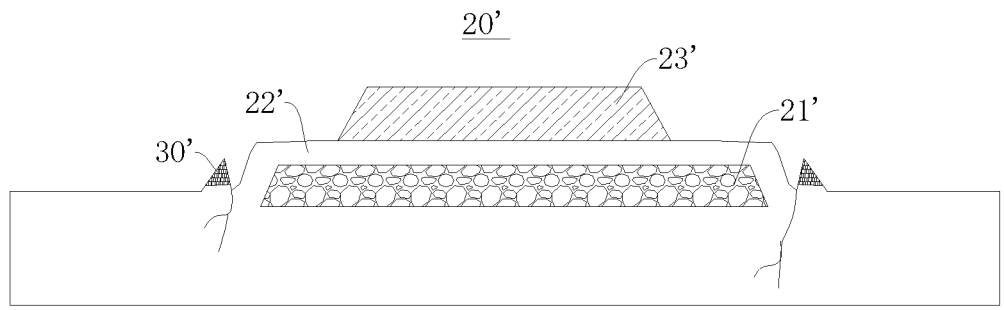
FIG. 1 illustrates a structural schematic of a display panel.

The features and exemplary embodiments of various aspects of the present disclosure are described in detail hereinafter. In the following detailed description, various specific details are provided in order to facilitate a comprehensive understanding of the present disclosure. However, it is obvious to those skilled in the art that the present disclosure can be implemented without some of these specific details. The following description of the embodiments is only to provide a better understanding of the present disclosure by showing examples of the present disclosure. In the drawings and the following description, at least a part of well-known structures and technologies are not shown in order to avoid unnecessary ambiguity of the present disclosure; and the size of some structures may be exaggerated for clarity. In addition, the features, structures or characteristics described below may be combined in one or more embodiments in any suitable manner.

In the description of the present disclosure, it should be noted that, unless otherwise specified, "plurality" means two or more; the terms "upper", "lower", "left", "right", "inner", and "outer" for indicating orientation or positional relationships are only for the convenience of describing the present disclosure and simplifying the description, rather than indicating or implying that the device or element referred to must have a specific orientation, be constructed and operated in a specific orientation, and therefore cannot be understood as the limitation of the present disclosure. In addition, the terms "first", "second" and the like are only used for descriptive purposes, and cannot be understood as indicating or implying relative importance.

The orientation terms in the following description indicate directions shown in the drawings, and do not limit the specific structure of the embodiment of the present disclosure. In the description of the present disclosure, it should also be noted that, unless otherwise clearly specified and limited, the terms "installation" and "connection" should be understood in a broad sense. For example, it can be a fixed connection or a detachable connection, or an integral connection; it can be a direct connection or an indirect connection. For those skilled in the art, specific meanings of the above-mentioned terms in the present disclosure can be understood according to specific conditions. The inventor found that the cause of the failure of some display panels is that the insulation layer is over-etched or broken, thereby causing the display panel to fail. Moreover, after further improving the material of the insulation layer, it is found that the fracture problem of the insulation layer is still not well improved.

As shown in FIG. 1, in the existing technology, a touch film layer 20' may include a first metal wire 21', an intermediate insulation layer 22', and a second metal wire 23', which are sequentially disposed on a display device layer. The first metal wire 21' overlaps the second metal wire 23', and the width of the second metal wire 23' is less than the width of the first metal wire 21', such that a flat portion and a protrusion portion may be formed on the surface of the intermediate insulation layer 22'. The protrusion portion may correspond to the first metal wire 21', and a tilt angle region may be formed between the side surface and the flat surface of the protrusion portion. When the second metal wire 23' is prepared, the metal residue 30' may be easily formed in the tilt angle region. On the other hand, due to the unevenness of the tilt angle region, when the second metal wire 23' is subjected to a patterned etching process, the second metal wire 23' in the tilt angle region before the etching process needs to be etched away because the width of the second metal wire 23' is less than the width of the first metal wire 21'. As a result, over-etching may exist in the transition region, which further causes the intermediate insulation layer 22' corresponding to the tilt angle region to be over-etched, and the intermediate insulation layer 22' may have a recessed portion in the over-etched region of the tilt angle region. Finally, the metal residue and the recessed portion may produce a significant step difference, thereby forming a significant stress concentration region. The stress concentration region may cause the intermediate insulation layer 22 in the tilt angle region to be easily broken, which may reduce the film layer stability, and also increase the short circuit risk between the first metal wire 21' and the second metal wire 23', thereby affecting the yield of the display panel.

The present disclosure may be used to solve the above-mentioned technical problems. In order to better understand the present disclosure, the display panel and the display apparatus according to embodiments of the present disclosure are described in detail below with reference to FIGS. 2 to 21.

Figure 2:
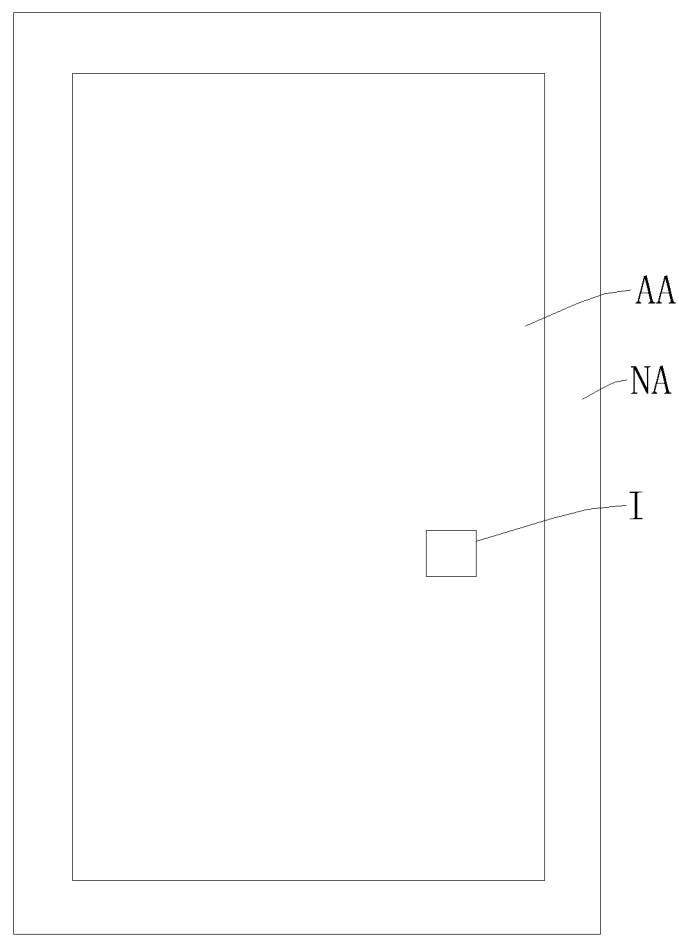
FIG. 2 illustrates a top view of an exemplary display panel according to various embodiments of the present disclosure.

Referring to FIG. 2, FIG. 2 illustrates a top view of a display panel according to various embodiments of the present disclosure.

As shown in FIG. 2, a display panel 10 provided by embodiments of the present disclosure may include a display region and a non-display region. In other embodiments, the display panel 10 may be a full-screen display, and the display panel 10 may not include a non-display region.

Figure 3:
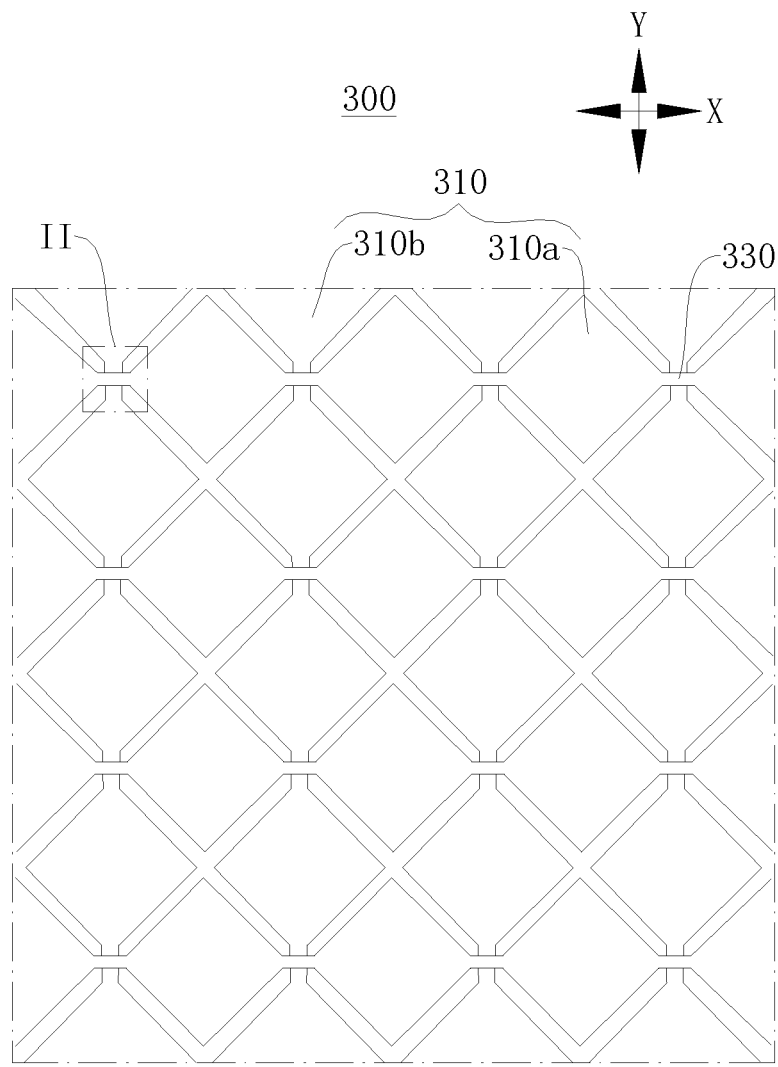
FIG. 3 illustrates a local enlarged structural schematic at a region I in FIG. 2.
Figure 4:
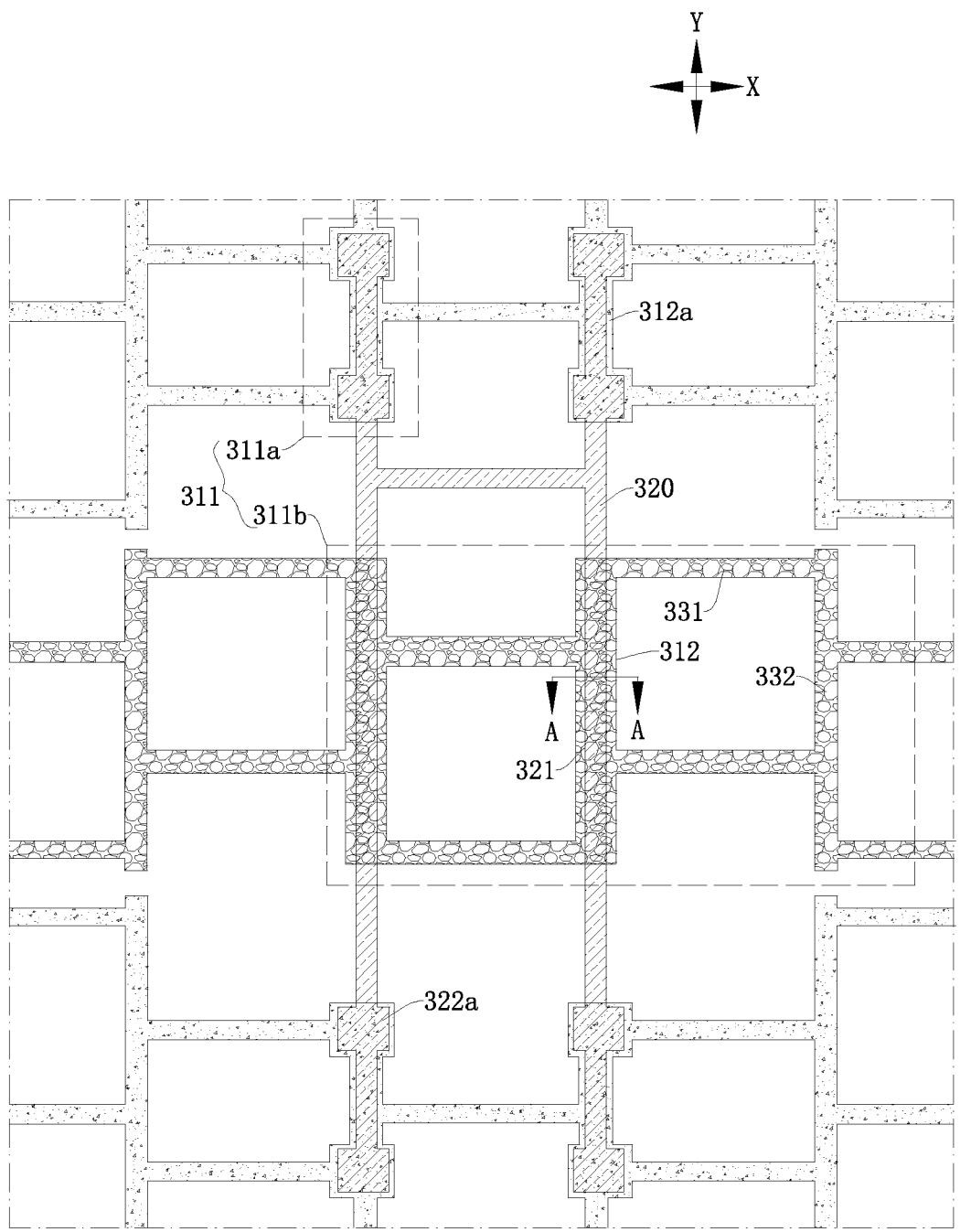
FIG. 4 illustrates a local enlarged structural schematic at a region II in FIG. 3.
Figure 5:
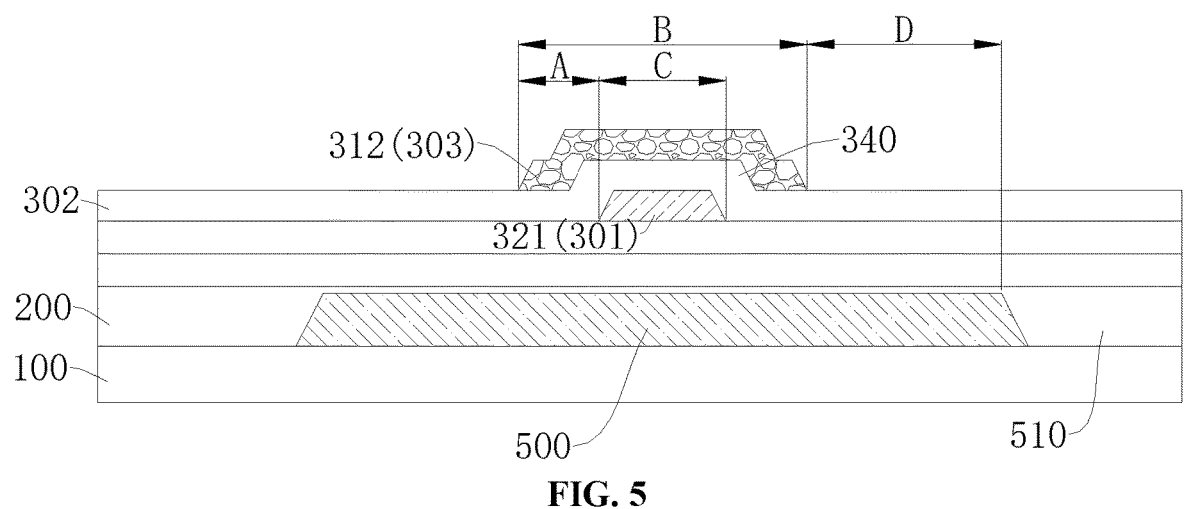
FIG. 5 illustrates a cross-sectional view along a A-A line in FIG. 4.

Referring to FIGS. 3-5, FIG. 3 illustrates a local enlarged structural schematic at a region I in FIG. 2; FIG. 4 illustrates a local enlarged structural schematic at a region II in FIG. 3; and FIG. 5 illustrates a cross-sectional view along a A-A line in FIG. 4.

As shown in FIGS. 3-5, the display panel 10 provided by embodiments of the present disclosure may include a substrate 100, a display device 200 disposed on the substrate 100, and a touch control device 300 disposed on a side of the display device 200 away from the substrate 100. The touch control device 300 may include a bridge layer 301, an insulation layer 302, and a touch control electrode layer 303, which are sequentially stacked along the light exiting direction of the display panel 10. The bridge layer 301 may include a plurality of bridge electrodes 320; the touch control electrode layer 303 may include touch control electrodes 310 arranged along the first direction X or the second direction Y; and the second direction may intersect the first direction. It should be noted that FIG. 3 shows the exemplary first direction and the exemplary second direction, but the directions may not be limited to above shown directions. The touch control electrode 310 may include a touch control electrode portion 311. Along the direction perpendicular to the plane where the display panel 10 is located, the touch control electrode portion 311 may at least partially overlap the bridge electrode 320. The touch control electrode portion 311 may include a plurality of touch control metal portions 312 formed in a metal grid shape and electrically connected with each other, and the bridge electrode 320 may include a plurality of bridge metal portions 321. Along the direction perpendicular to the plane where the display panel 10 is located, at least a part of the touch control metal portion 312 extending along the same direction may cover a part of the bridge metal portion 321.

In the display panel provided by embodiments of the present disclosure, the bridge electrode 320 of the present disclosure may be a metal grid electrode or a strip electrode. When the bridge electrode 320 is a metal grid electrode, the bridge electrode 320 may include bridge metal portions 321 which extend along the first direction and the second direction and are electrically connected with each other. When the bridge electrode 320 is a strip electrode, the bridge electrode 320 may include bridge metal portions 321 extending along the second direction. The "bridge metal portion 321" referred to herein is the microscopic wiring structure of the bridge electrode 320. For example, when the bridge electrode 320 is a grid electrode, the bridge metal portion 321 may be a part or all of the metal line segments of a single metal grid; when the bridge electrode 320 is a strip electrode, the bridge metal portion 321 may be one strip electrode or partial strip electrode.

Meanwhile, the touch control electrode 310 of the present disclosure may be a metal grid electrode or a strip electrode. When the touch control electrode 310 is a metal grid electrode, the touch control electrode 310 may include touch control metal portions 311 which extend along the first direction and the second direction and are electrically connected with each other; and when the touch control electrode 310 is a strip electrode, the touch control electrode 310 may include touch control metal portions 311 extending along the second direction. It can be understood that the "touch control metal portion 312" referred to herein is the microscopic wiring structure of the touch control electrode portion 311. For example, when the touch control electrode portion 311 is a metal grid structure, the touch control metal portion 312 may be a part or all of the metal line segments of a single metal grid.

The "touch control electrode portion 311" in the present disclosure may refer to a portion on the touch control electrode 310 that overlaps the bridge electrode 320 along the direction perpendicular to the plane where the display panel 10 is located.

In embodiments of the present disclosure, along the direction perpendicular to the plane where the display panel is located, at least a part of the touch control metal portion 312 extending along the same direction may cover the bridge metal portion 321. It can be understood that at least a part of the touch control metal portion 312 extending along the first direction may cover the bridge metal portion 321 extending along the first direction, and/or at least a part of the touch control metal portion 312 extending along the second direction may cover the bridge metal portion 321 extending along the second direction. As shown in FIGS. 4-5, along the direction perpendicular to the extension of the touch control metal portion 312 or the bridge metal portion 321, the width of the touch control metal portion 312 may be greater than the width of the bridge metal portion 321. In embodiments of the present disclosure, due to the existence of the bridge metal portion 321, when the insulation layer 302 is prepared on the bridge metal portion 321, the portion of the insulation layer 302 corresponding to the bridge metal portion 321 may be higher than other portions, which may result in that the regions on the insulation layer 302 corresponding to two sides of the bridge metal portion 321 may form tilt angle regions. In the present disclosure, at least a part of the touch control metal portion 312 extending along the same direction may cover a part of the bridge metal portion 321; that is, the touch control metal portion 312 may have a relatively large extension magnitude along the first direction, and the width of the touch control metal portion 312 may be greater than the width of the bridge metal portion 321, such that the touch control metal portion 312 may extend beyond the tilt angle region. In such way, when the metal layer where the touch control metal portion 312 is located is etched to form the touch control metal portion 312, the metal layer where the touch control metal portion is located may not be etched in the tilt angle region. Therefore, the metal residue generated when the touch control metal portion is formed through etching due to the tilt angle region may be avoided, and the metal residue may be further eliminated. Meanwhile, the structural strength of the insulation layer 302 may not be affected by the stress concentration caused by the metal residue, which may improve the integrity of the insulation layer 302 and prevent the broken insulation layer 302 which causes the metal short circuit from affecting the yield of the display panel 10, thereby improving the yield of the display panel 10.

In addition, since the touch control metal portion 312 can extend beyond the tilt angle region, the metal material in the tilt angle region does not need to be etched when the touch control metal portion 312 is prepared, and furthermore, no metal residues 30' with angular shapes may be remained. Since the metal material in the tilt angle region does not need to be etched away, it may not cause the insulation layer 302 corresponding to the tilt angle region to be over-etched; may also not cause the insulation layer 302 to be over-etched in the tilt angle region to form the recessed portion which may cause the insulation layer 302 to be in danger of breaking; and may improve the integrity of the insulation layer 302, prevent the broken insulation layer 302 which causes the metal short circuit from affecting the yield of the display panel 10, thereby improving the yield of the display panel 10.

Referring to FIG. 5, in some optional embodiments, the insulation layer 302 may include the first insulation portion 340 covering the bridge metal portion 321, and the surface of the first insulation portion 340 away from the substrate 100 may protrude toward the light exiting surface of the display panel 10. The orthographic projection of the bridge metal portion 321 on the substrate 100 may be located within the orthographic projection of the first insulation portion 340 on the substrate 100; and the orthographic projection of the first insulation portion 340 on the substrate 100 may be within the orthographic projection of the touch control metal portion 312 on the substrate 100.

Figure 6:
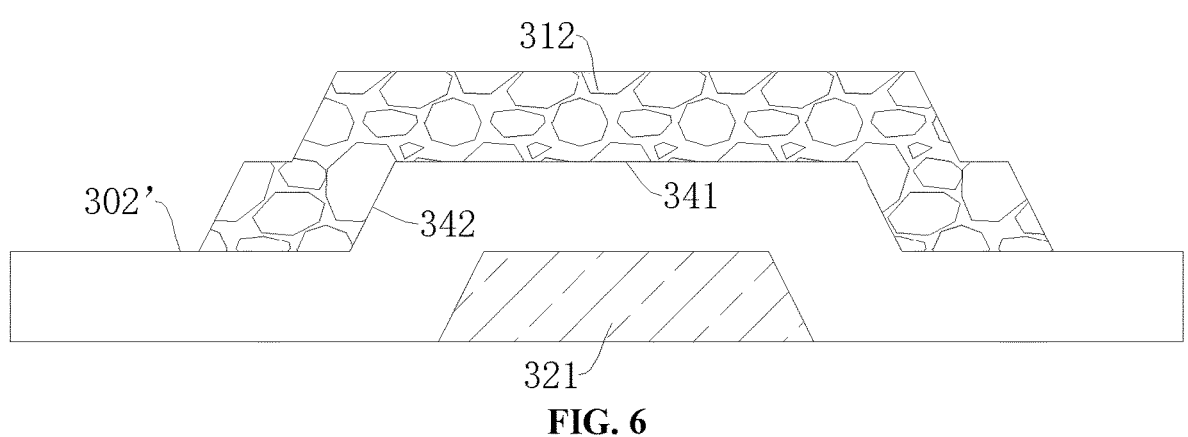
FIG. 6 illustrates a local enlarged structural schematic in FIG. 5.

Referring to FIGS. 5-6, FIG. 6 illustrates a local enlarged structural schematic in FIG. 5.

As shown in FIGS. 5-6, the first insulation portion 340 may include a top surface 341 and side surfaces 342 connected to two sides of the top surface 341. The insulation layer 302 may further include a flat portion 302'; and the top surface 341 may be connected to the flat portion 302' through the side surface 342. The surface of the first insulation portion 340 away from the substrate 100 protrudes toward the light exiting surface of the display panel 10, that is, the top surface 341 protrudes from the flat portion 302', so that the tilt angle region may be formed between the side surface 342 and the flat portion 302'; and the metal residue 30' may be easily formed in the tilt angle region.

In some optional embodiments, the first insulation portion 340 may be located above the bridge metal portion 321, and the orthographic projection of the bridge metal portion 321 on the substrate 100 may be within the orthographic projection of the first insulation portion 340 on the substrate 100, such that the first insulation part 340 may provide better protection to the bridge metal portion 321. The orthographic projection of the first insulation portion 340 on the substrate 100 is within the orthographic projection of the touch control metal portion 312 on the substrate 100, such that the touch control metal portion 312 may extend beyond the tilt angle region, that is, the touch control metal portion 312 may cover the tilt angle region. In such way, when the touch control metal portion 312 is formed through etching in the etching process, the tilt angle region may not be etched. Therefore, the metal residue or over-etching of the insulation layer in such region caused by etching in the tilt angle region may be avoided, and the first insulation portion 340 and the insulation layer 302 on the surrounding region of the first insulation portion 340 may be prevented from being broken. In addition, since the touch control metal portion 312 extends beyond the tilt angle region, the metal material in the tilt angle region may not need to be etched when the touch control metal portion 312 is prepared. It may not cause over-etching which results in the first insulation portion 340 corresponding to the tilt angle region to be over-etched to form the recessed portion, and the first insulation part 340 may be prevented from being broken. Therefore, in one embodiment, the reliability of the insulation layer 302 may be ensured, and the short circuit connection between the upper and lower metals of the insulation layer 302 may be avoided.

Optionally, multiple manners may be used to configure the sizes of the orthographic projection of the first insulation portion 340 on the substrate 100 and the orthographic projection of the touch control metal portion 312 on the substrate 100. For example, the orthographic projection of the first insulation portion 340 on the substrate 100 and the orthographic projection of the touch control metal portion 312 on the substrate 100 may have a same size.

In some other optional embodiments, as shown in FIG. 6, the orthographic projection of the touch control metal portion 312 on the substrate 100 may be greater than the orthographic projection of the first insulation portion 340 on the substrate 100, such that the touch control metal portion 312 may better cover the top surface 341 and the side surface 342 of the first insulation portion 340. The touch control metal portion 312 may cover the tilt angle region and extend beyond the tilt angle region; no metal residue 30' may be formed in the tilt angle region to cause the stress concentration and breakage of the insulation layer 302; the insulation layer 302 corresponding to the tilt angle region may not be over-etched to be broken; and the reliability of the insulation layer 302 may be ensured.

Referring to FIG. 5, in some optional embodiments, in at least the part of the touch control metal portion 312 and the bridge metal portion 321 covered by the part of the touch control metal portion 312, the touch control metal portion 312 has the first line width B; the bridge metal portion 321 has the second line width C; and the first line width B and the second line width C satisfy the following relationship:

$$\frac{(B-a)-(C+a)}{2} \geq 0.6 \text{ μm}$$

Where a is the absolute value of the manufacturing tolerance. There are a plurality of values for a, for example, a may be about 0.8 μm.

In some optional embodiments, when the first line width B and the second line width C satisfy the above relationship, that is, when the distance A between the edge of the bridge metal portion 321 and the edge of the touch control metal portion 312 is greater than or equal to 0.6 it can ensure that the touch control metal portion 312 can cover the top surface 341 and the side surface 342 of the first insulation portion 340 and a portion of the flat portion 302', the metal residue 30' may not be formed in the tilt angle region, the stress concentration on the insulation layer 302 caused by the metal residue 30' may be further reduced, and the fracture problem of the insulation layer 302 may be reduced.

Multiple manners may be used to configure the touch control electrode 310. In some optional embodiments, referring to FIG. 3, the touch control electrode 310 may include a plurality of first touch control electrode blocks 310a; and two adjacent first touch control electrode blocks 310a arranged along the first direction may be electrically connected with each other by the connection electrode 330. Optionally, the touch control electrode 310 may further include a plurality of second touch control electrode blocks 310b, and two adjacent second touch control electrode blocks 310b arranged along the second direction may be electrically connected with each other through the bridge electrode 320. The touch control electrode portion 311 may include a connection electrode portion 311b which is a partial structure of the connection electrode 330. That is, the part of the connection electrode 330 that overlaps the bridge electrode 320 along the direction perpendicular to the plane where the display panel 10 is located may be the connection electrode portion 311b.

In some optional embodiments, the plurality of first touch control electrode blocks 310a may be electrically connected with each other through the connection electrodes 330 disposed in a same layer; and the plurality of second touch control electrode blocks 310b may be connected with each other through the bridge electrodes 320 of the bridge layer 301. The first touch control electrode blocks 310a and the second touch control electrode blocks 310b may be used to implement touch control function.

As described above, the connection electrode 330 may be connected between two adjacent first touch control electrode blocks 310a along the first direction, such that the connection electrodes 330 as a whole may extend along the first direction. The bridge electrode 320 may be connected between two adjacent second touch control electrode blocks 310b along the second direction, such that the bridge electrodes 320 as a whole may extend along the second direction. Therefore, at least a part of the bridge metal portion 321 of the bridge electrode 320 and at least a part of the connection electrode portion 311b of the connection electrode 330 may be overlapped with each other along the direction perpendicular to the plane where the display panel 10 is located.

In the connection electrode 330 and the bridge electrode 320 that are overlapped with each other, when preparing the connection electrode 330, the metal residue 30' may be easily formed on the surface of the insulation layer 302 located above the bridge metal portion 321 of the bridge electrode 320. On the one hand, such part of the metal residue 30' may be easily electrically connected to the connection electrode portion 311b. On the other hand, such part of the metal residue 30' may easily cause the insulation layer 302 to break, so that the metal residue 30' and the bridge metal portion 321 of the bridge electrode 320 may be connected with each other, which may further cause that the first touch control electrode block 310a and the second touch control electrode block 310b may be short circuited with each other.

In some optional embodiments, referring to FIG. 4, along the direction perpendicular to the plane where the display panel 10 is located, at least a part of the touch control metal portion 312 in the connection electrode portion 311b extending along the same direction may cover at least a part of the bridge metal portion 321.

In some optional embodiments, at least a part of the touch control metal portion 312 in the connection electrode portion 311b extending along the same direction may cover at least a part of the bridge metal portion 321. That is, in the connection electrodes 330 and the bridge electrodes 320, the connection electrode portion 311b extending along the same direction may cover at least a part of the bridge metal portion 321. That is, along the direction perpendicular to the extending direction of the connection electrode portions 311b and a part of the bridge metal portions 321, the width of the connection electrode portion 311b may be greater than the width of the bridge metal portion 321. For example, the connection electrode portion 311b and a part of the bridge metal portions 321 extend along the second direction, and the first direction is perpendicular to the second direction, such that the extension width of the connection electrode portion 311b along the first direction may be greater than the extension width of the bridge metal portion 321 along the first direction. As described above, since the connection electrode portion 311b is above the insulation layer 302, the width of the connection electrode portion 311b is relatively large, and the connecting electrode portion 311b can extend to the tilt angle region of the insulation layer 302. Therefore, the metal residue 30' in the tilt angle region can be reduced, the insulation layer 302 corresponding to the tilt angle region can be prevented from being over-etched, the short circuit of the touch control electrode 310 caused by the breakage of the insulation layer 302 may be improved, and the yield of the display panel 10 may be increased.

Multiple manners may be used to configure the connection electrode 330. In some optional embodiments, referring to FIG. 4, the connection electrode portion 311b may include the first connection metal portion 331 extending along the first direction and the second connection metal portion 332 extending along the second direction; and the second connection metal portion may be connected to adjacent first connection metal portions 331 along the second direction. As described above, the entire bridge electrode 320 may extend along the second direction, such that relatively large number of the bridge metal portions 321 and the second connection metal portions 332 in the bridge electrode 320 may extend along a same direction, and the metal residue 30' may be easily generated on two sides of the second connection metal portion 332.

Optionally, along the direction perpendicular to the plane where the display panel 10 is located, at least a part of the second connection metal portion 332 extending along the same direction may cover at least a part of the bridge metal portion 321. Along the direction perpendicular to the extension of the second connecting metal portion 332 and at least a part of the bridge metal portion 321, the width of the second connection metal portion 332 may be greater than the width of the bridge metal portion 321. For example, the extension direction of the second connection metal portion 332 and at least a part of the bridge metal portion 321 is the second direction, such that the extension width of the second connection metal portion 332 along the first direction may be greater than the extension width of at least a part of the bridge metal portion 321 along the first direction. As described above, since the bridge metal portion 321 is under the insulation layer 302, the existence of the bridge metal portion 321 may cause the tilt angle region to be formed on the insulation layer 302. However, the second connection metal portion 332 may be above the insulation layer 302, the width of the second connection metal portion 332 may be relatively large, and the second connection metal portion 332 may extend to the tilt angle region of the insulation layer 302. Therefore, the metal residue 30' in the tilt angle region may be reduced, and the insulation layer 302 corresponding to the tilt angle region may be prevented from being broken due to excessive etching.

Optionally, at least a part of the second connection metal portion 332 may have the above-mentioned first line width B, and the bridge metal portion 321 covered by the second connection metal portion 332 may have the above-mentioned second line width C. The line widths of the second connection metal portion 332 and the bridge metal portion 321 may satisfy the above-mentioned expression.

Optionally, as shown in FIG. 4, two adjacent first connection metal portions 331 arranged along the second direction and two adjacent second connection metal portions 332 arranged along the first direction may enclose a single metal grid; and at least two metal grids may be sequentially arranged along the first direction to form the connection electrode 330. The metal grid structure may greatly reduce the impedance of the connection electrode 330.

The plurality of metal grids may be sequentially arranged along the first direction. Or as shown in FIG. 4, the plurality of metal grids may be arranged in a staggered manner along the first direction. That is, the first connection metal portion 331 in a metal grid may be connected to the middle part of the second connection metal portion 332 in another metal grid along the second direction.

In some optional embodiments, referring to FIG. 4, the touch control electrode portion 311 may include the second touch control electrode portion 311a which is a partial structure of the second touch control electrode block 310b. That is, a part of the second touch control electrode block 310b that overlaps the bridge electrode 320 along the direction perpendicular to the plane where the display panel 10 is located may be the second touch control electrode portion 311a. Along the direction perpendicular to the plane where the display panel 10 is located, at least a part of the touch control metal portion 312 in the second touch control electrode portion 311a extending along the same direction may cover at least a part of the bridge metal portion 321. Along the direction perpendicular to the extension of at least the part of the touch control metal portion 312 and at least the part of the bridge metal portion 321, the width of the touch control metal portion 312 may be greater than the width of the bridge metal portion 321. For example, the extension direction of at least the part of the touch control metal portion 312 and at least the part of the bridge metal portion 321 is the second direction; such that the extension width of the part of the touch control metal portions 312 along the first direction may be greater than the extension width of at least the part of the bridge metal portion 321 along the first direction. As described above, the existence of the bridge metal portion 321 may cause the tilt angle region to be formed on the insulation layer 302. The touch control metal portion 312 may be above the insulation layer 302, the width of the touch control metal portion 312 may be relatively large, and the touch control metal portion 312 may extend to the tilt angle region of the insulation layer 302. Therefore, the metal residue 30' in the tilt angle region may be reduced, and the insulation layer 302 corresponding to the corner may be prevented from being broken due to excessive etching.

Optionally, at least a part of the second touch control electrode portion 311a may have the above-mentioned first line width B, and the bridge metal portion 321 covered by the part of the second touch control electrode portion 311a may have the above-mentioned second line width C. The first line width B and the second line width C may satisfy the above-mentioned relational expression.

Figure 7:
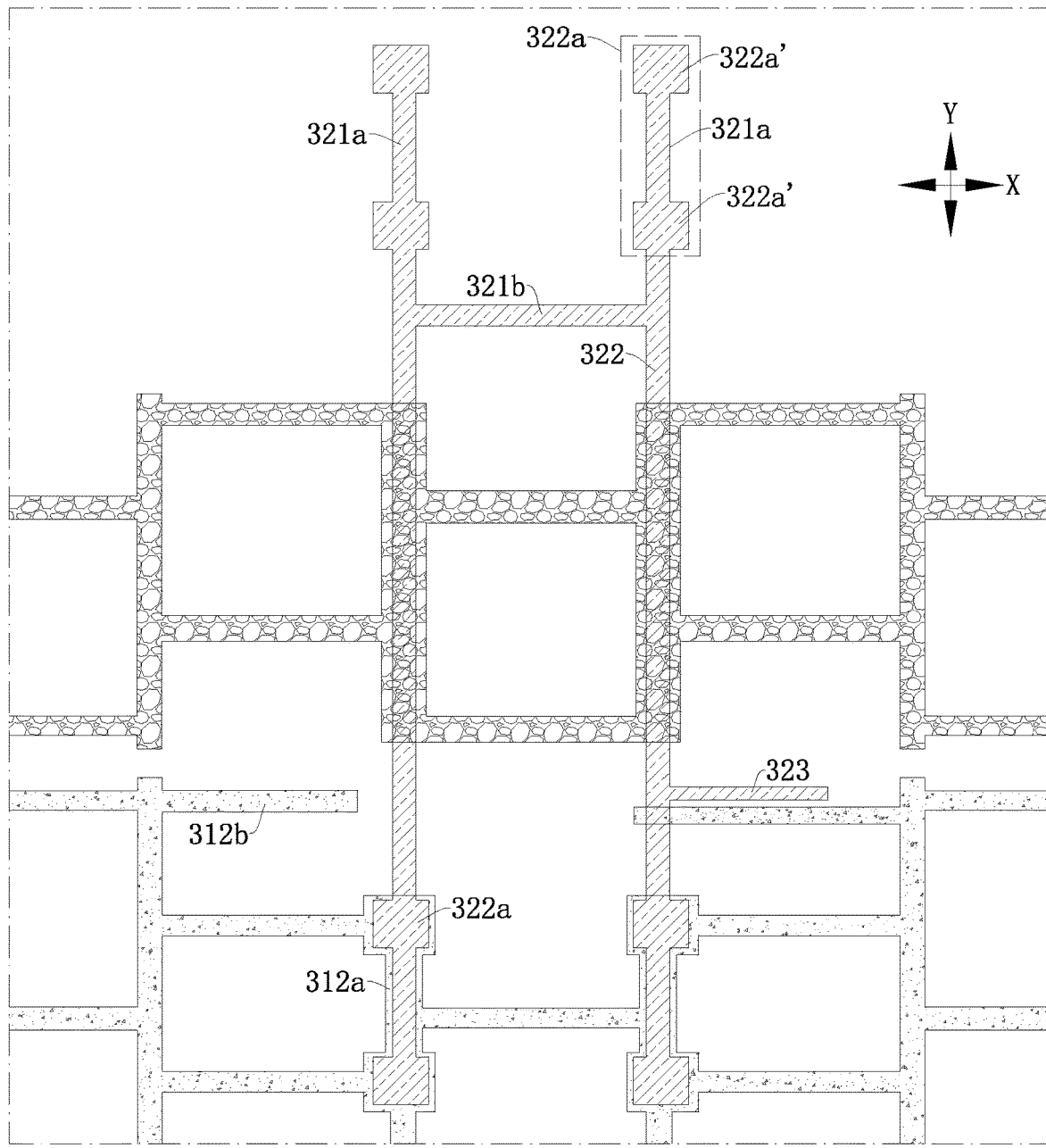
FIG. 7 illustrates another local enlarged structural schematic at a region II in FIG. 3.

Referring to FIGS. 4 and 7, the difference between FIG. 7 and FIG. 4 is that a part of the wiring of the touch control metal portions 312 of the first touch control electrode blocks 310a is omitted in FIG. 7 to better show the wiring structure of the bridge electrode 320.

In some optional embodiments, as shown in FIGS. 4 and 7, the bridge electrode 320 may include at least two bridge portions 322 that extend along the second direction and are arranged along the first direction. At least one bridge portion 322 may be electrically connected to one second touch control electrode block 310b through a bridge via portion 322a.

In some optional embodiments, the bridge electrode 320 may include at least two bridge portions 322, and two adjacent second touch control electrode blocks 310b along the second direction may be connected with each other through the two bridge portions 322, which may ensure the stability of the connection between two adjacent second touch control electrode blocks 310b.

Optionally, the bridge via portion 322a may include at least two vias 322a' arranged along the second direction. In such way, the bridge portion 322 may be connected to the second touch control electrode block 310b through two vias 322a', which may further improve the stability and yield of the connection between the second touch control electrode block 310b and the bridge electrode 320.

In some optional embodiments, as shown in FIG. 7, the bridge portion 322 may include the first bridge metal portion 321a disposed between two vias 322a' arranged along the second direction. Along the direction perpendicular to the plane where the display panel 10 is located, at least a part of the touch control metal portion 312 in the second touch control electrode portion 311a may cover the first bridge metal portion 321a. Along the direction perpendicular to the extending direction of at least a part of the touch control metal portion 312 and at least a part of the first bridge metal portion 321a, the width of the touch control metal portion 312 may be greater than the width of the first bridge metal portion 321a. For example, the extension direction of at least the part of the touch control metal portion 312 and at least the part of the first bridge metal portion 321a is the second direction; such that the extension width of the part of the touch control metal portion 312 along the first direction may be greater than the extension width of at least the part of the first bridge metal portion 321a along the first direction. As described above, the existence of the first bridge metal portion 321a may cause the tilt angle region to be formed on the insulation layer 302. The touch control metal portion 312 may be above the insulation layer 302, the width of the touch control metal portion 312 may be relatively large, and the touch control metal portion 312 may extend to the tilt angle region of the insulation layer 302. Therefore, the metal residue 30' in the tilt angle region may be reduced, and the insulation layer 302 corresponding to the tilt angle region may be prevented from being broken due to excessive etching.

Optionally, the bridge electrode 320 may include the second bridge metal portion 321b extending along the first direction, and the second bridge metal portion 321b may be connected to two adjacent bridge portions 322, thereby reducing the impedance of the bridge electrode 320.

In some optional embodiments, along the direction perpendicular to the plane where the display panel 10 is located, at least a part of the touch control metal portion 312 in the second touch control electrode portion 311a may cover the second bridge metal portion 321b. As described above, when at least the part of the touch control metal portion 312 cover the second bridge metal portion 321b, along the direction perpendicular to its extension direction, the width of at least the part of the touch control metal portion 312 may be greater than the width of the second bridge metal portion 321b. Therefore, at least the part of the touch control metal portion 312 may extend to the tilt angle regions corresponding to the second bridge metal portion 321b, which may improve the shape of the metal residue 30' in the tilt angle regions, and prevent the insulation layer 302 corresponding to the tilt angle regions from being broken due to excessive etching.

Figure 8:
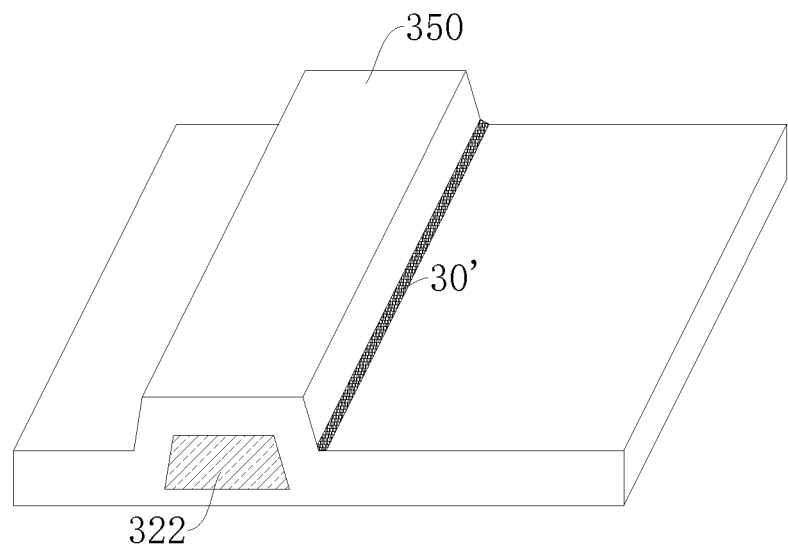
FIG. 8 illustrates a local three-dimensional structural schematic of a touch control electrode of a display panel according to various embodiments of the present disclosure.

Referring to FIG. 8, FIG. 8 illustrates a local three-dimensional structural schematic of the touch control electrode 310 of the display panel 10 according to various embodiments of the present disclosure.

As shown in FIG. 8, due to the existence of the bridge portion 322, the protrusion corresponding to the bridge portion 322 may be formed on the insulation layer 302. The protrusion may be, for example, the second insulation portion 350. The existence of the second insulation portion 350 may cause the tilt angle region to be formed on the insulation layer 302, and the metal residue 30' may be formed in the tilt angle region. When the bridge portion 322 extends along the second direction, the second insulation portion 350 may extend along the second direction, and the tilt angle region extending along the second direction may be formed on the insulation layer 302. Furthermore, the metal residue 30' extending along the second direction may be formed. It can be seen that, in conjunction with FIG. 7, since the bridge electrode 320 is connected between two adjacent second touch control electrode blocks 310b via the connection electrode 330, the metal residue 30' may extend along the second direction, causing the connection electrode 330 and the bridge electrode 320 or the second touch control electrode block 310b to be short circuited.

Figure 9:
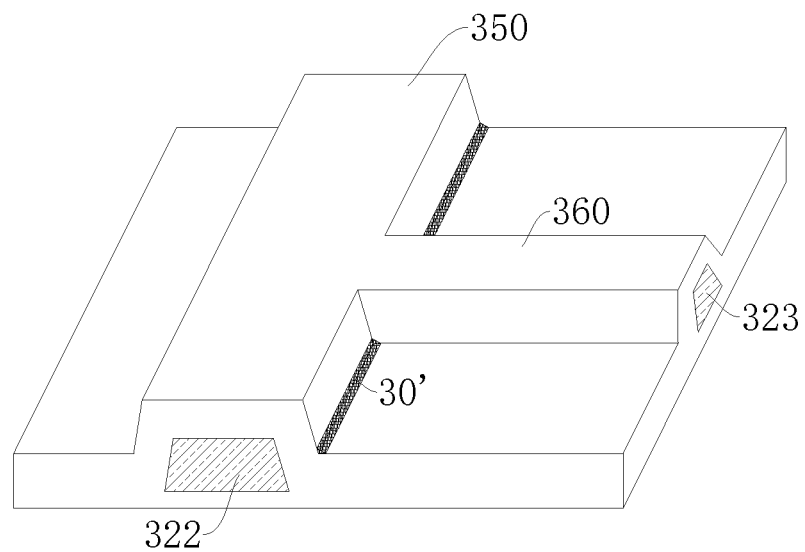
FIG. 9 illustrates another local three-dimensional structural schematic of a touch control electrode of a display panel according to various embodiments of the present disclosure.

Referring to FIGS. 7 and 9, FIG. 9 illustrates another local three-dimensional structural schematic of the touch control electrode 10 of the display panel 10 according to various embodiments of the present disclosure.

In some optional embodiments, as shown in FIGS. 7 and 9, the bridge electrode 320 may further include an auxiliary electrode portion 323. The auxiliary electrode portion 323 may extend along the first direction and one end of the auxiliary electrode portion 323 may be electrically connected to at least one side of the bridge electrode 320 along the first direction.

In some optional embodiments, the bridge electrode 320 may be further disposed with the auxiliary electrode portion 323. The auxiliary electrode portion 323 may be, for example, connected to one side of the bridge portion 322 along the first direction; and the auxiliary electrode portion 323 may extend along the first direction. The insulation layer 302 may form another protrusion such as the third insulation portion 360 on the auxiliary electrode portion 323. The third insulation portion 360 may be connected to one side of the second insulation portion 350 along the first direction, and the third insulation portion 360 may extend along the first direction. The third insulation portion 360 may cut off the metal residue 30' in the tilt angle region on one side of the second insulation portion 350, causing the metal residue 30' to break, which may further reduce the short circuit between the connection electrode 330 and the second touch control electrode block 310b or the short circuit between the connection electrode 330 and the bridge electrode 320 caused by the metal residue 30', thereby further improving the yield of the display panel 10.

When the metal residue 30' is between the connection electrode 330 and the bridge via portion 322a, the metal residue 30' may cause the insulation layer 302 to break, which may make the metal residue 30' to connect the bridge electrode 320 with the connection electrode 330, thereby causing the first touch control electrode block 310a and the second touch control electrode block 310b to be short circuited.

In some optional embodiments, as shown in FIG. 7, along the second direction, the auxiliary electrode portion 323 may be located between the connection electrode 330 and the bridge via portion 322a. In some optional embodiments, the auxiliary electrode portion 323 may be located between the connection electrode 330 and the bridge via portion 322a. Therefore, the third insulation portion 360 may be located between the connection electrode 330 and the bridge via portion 322a, such that the third insulation portion 360 may cut off the metal residue 30' between the connection electrode 330 and the bridge via portion 322a, thereby improving the yield of the display panel 10.

In some optional embodiments, as shown in FIG. 7, the second touch control electrode block 310b may include the first touch control metal portion 312a disposed between the bridge via portion 322a and the connection electrode 330 along the second direction. Along the direction perpendicular to the plane where the display panel 10 is located, the first touch control metal portion 312a may overlap at least a part of the bridge metal portion 321. Along the second direction, the auxiliary electrode may be located between the first touch control metal portion 312a and the connection electrode 330.

In some optional embodiments, the second touch control electrode block 310b may include the first touch control metal portion 312a closer to the bridge electrode 320, and the first touch control metal portion 312a may overlap a part of the bridge metal portion 321. Therefore, the metal residue 30' between the first touch control metal portion 312a and the bridge metal portion 321 may also cause the first touch control electrode block 310a and the second touch control electrode block 310b to be short circuited. The auxiliary electrode portion may be located between the first touch control metal portion 312a and the connection electrode 330, such that the third insulation portion 360 can cut off the metal residue 30' between the first touch control metal portion 312a and the connection electrode 330, thereby further reducing the short circuit between the first touch control electrode block 310a and the second touch control electrode block 310b.

Optionally, as shown in FIG. 7, the second touch control electrode block 310b may include the second touch control metal portion 312b extending along the first direction. The end of the second touch control metal portion 312b adjacent to the bridge electrode 320 and the bridge electrode 320 may be spaced apart along the second direction.

In some optional embodiments, the second touch control metal portion 312b may be spaced apart from the bridge electrode 320. When the metal residue 30' is formed at a corresponding position above the bridge electrode 320, the metal residue 30' may be spaced apart from the second touch control metal portion 312b, which may further prevent the first touch control electrode block 310a and the second touch control electrode block 310b from being short circuited due to the metal residue 30'.

Figure 10:
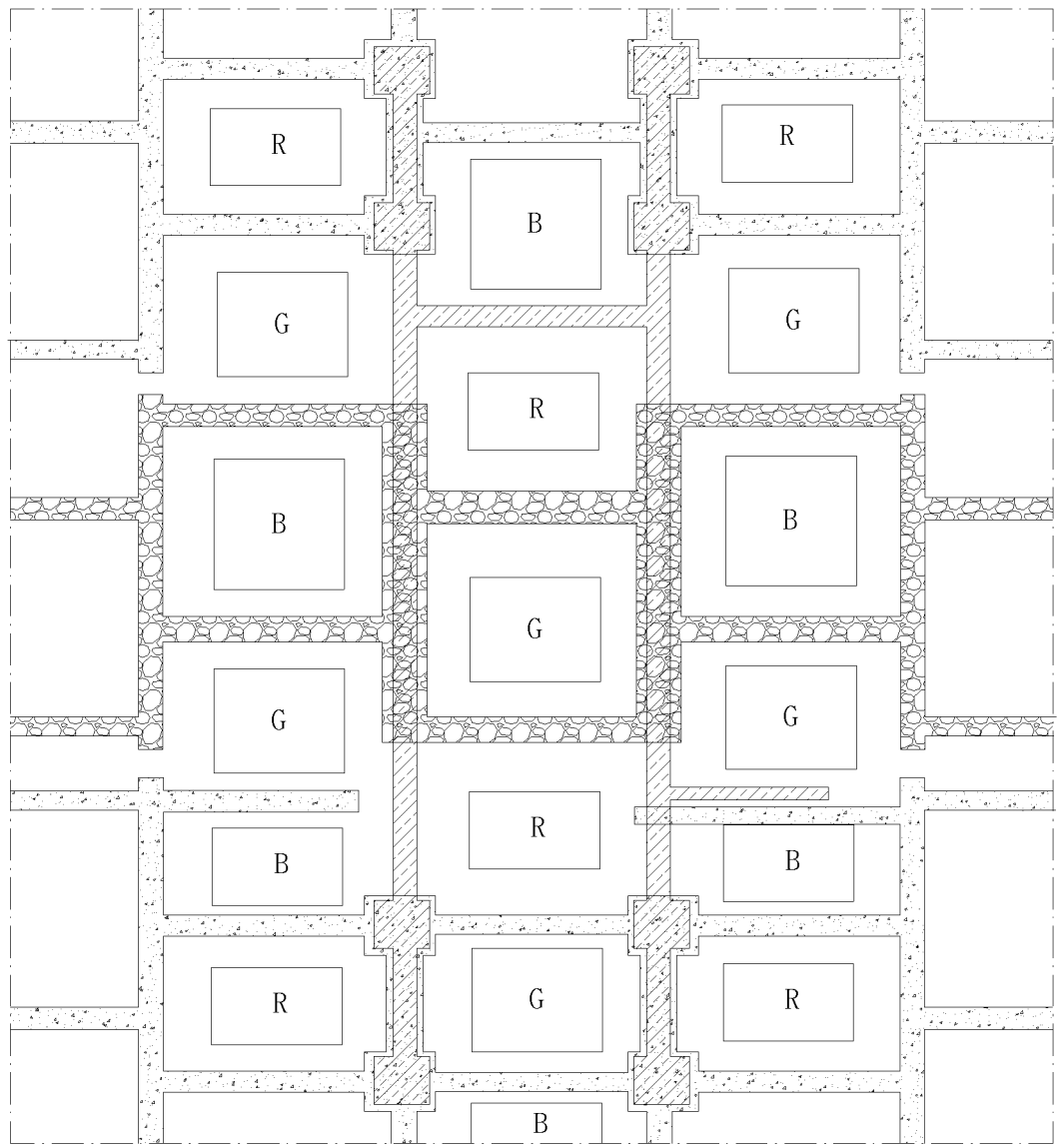
FIG. 10 illustrates a relative positional relationship between sub-pixels and touch control electrodes of a display panel according to various embodiments of the present disclosure.
Figure 11:
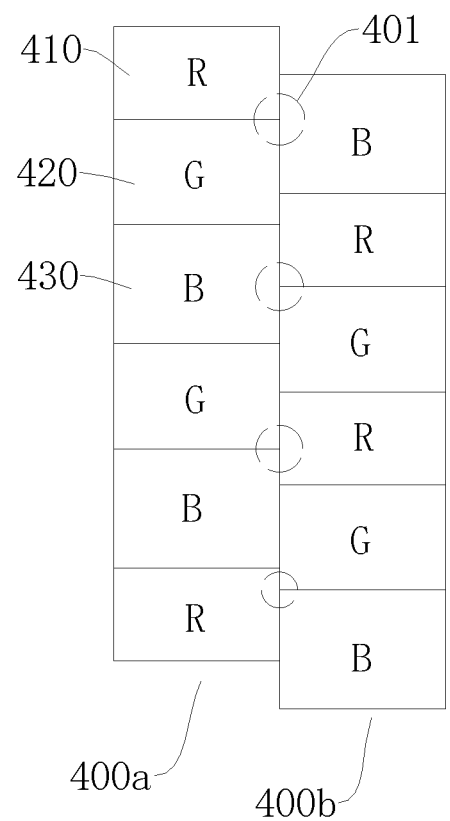
FIG. 11 illustrates a structural schematic of repeating units of a display panel according to various embodiments of the present disclosure.

Referring to FIGS. 10 and 11, FIG. 10 illustrates a relative positional relationship between sub-pixels and touch control electrodes 310 of the display panel 10 according to various embodiments of the present disclosure; and FIG. 11 illustrates a structural schematic of repeating units 400 of the display panel 10 according to various embodiments of the present disclosure. In order to achieve color display, the display panel 10 may include red sub-pixels 410, green sub-pixels 420, and blue sub-pixels 430.

Optionally, at least two bridge portions 322 may be separately disposed on two sides of the green sub-pixel 420 along the first direction. In some optional embodiments, the bridge portions 322 may be separately disposed on two sides of the green sub-pixel 420.

In embodiments of the present disclosure, the red sub-pixels 410, blue sub-pixels 430, and green sub-pixels 420 may be arranged in multiple manners. For example, the display panel 10 may include a plurality of repeating units 400 arranged in an array. The repeating unit 400 may include the first pixel group 400a, including a red sub-pixel 410, a green sub-pixel 420, a blue sub-pixel 430, a green sub-pixel 420, a blue sub-pixel 430, and a red sub-pixel 410, which are sequentially arranged along the second direction; and further include the second pixel group 400b on one side of the first pixel group 400a along the first direction. The second pixel group 400b may include a blue sub-pixel 430, a red sub-pixel 410, a green sub-pixel 420, a red sub-pixel 410, a green sub-pixel 420, and a blue sub-pixel 430, which are sequentially arranged along the second direction. The first pixel group 400a and the second pixel group 400b may be arranged to be staggered along the first direction.

In some optional embodiments, the first pixel group 400a and the second pixel group 400b may be staggered along the first direction. In such way, a red sub-pixel 410 and a green sub-pixel 420 in the first pixel group 400a which are adjacent to each other may form a white light-emitting display unit 401 with the first blue sub-pixel 430 in the second pixel group 400b; the blue sub-pixel 430 in the third position along the second direction in the first pixel group 400a may form a display unit 401 with the red sub-pixel 410 and the green sub-pixel 420 in the second and third positions along the second direction in the second pixel group 400b; the green sub-pixel 420 and the blue sub-pixel 430 in the fourth and fifth positions along the second direction in the first pixel group 400a may form a display unit 401 with the red sub-pixel 410 in the fourth position along the second direction in the second pixel group 400b; and the last red sub-pixel 410 in the first pixel group 400a may form a display unit 401 with the last green sub-pixel 420 and the last blue sub-pixel 430 in the second pixel group 400*b*. Therefore, the first pixel group 400*a* and the second pixel group 400*b* may form four display units 401, and the sub-pixels in each display unit 401 may all be true sub-pixels, which can improve the display effect of the display panel 10. In addition, the red sub-pixel 410, the green sub-pixel 420, and the blue sub-pixel 430 may be included in a same column or a same row, which may avoid the formation of obvious display stripes.

In other optional embodiments, the repeating unit may further include a third pixel group 400*a*' and a fourth pixel group 400*b*' arranged along the first direction. The third pixel group 400*a*' may include a red sub-pixel 410, a green sub-pixel 420, and a blue sub-pixel 430, which are sequentially arranged along the second direction; and the fourth pixel group 400*b*' may include a blue sub-pixel 430, a red sub-pixel 410, and a green sub-pixel 420, which are sequentially arranged along the second direction. The third pixel group 400*a*' and the fourth pixel group 400*b*' may be arranged to be staggered along the first direction. In such way, the red sub-pixel 410 and the green sub-pixel 420 in the third pixel group 400*a*' and the blue sub-pixel 430 in the fourth pixel group 400*b*' may form a white light-emitting display unit. The blue sub-pixel 430 in the third pixel group 400*a*' and the red sub-pixel 410 and the green sub-pixel 420 in the fourth pixel group 400*b*' may form a white light-emitting display unit.

Optionally, the line widths of the touch control metal portions 312 located on two sides of a same sub-pixel may be equal to improve the uniformity of the display effect of the display panel 10.

Referring to FIG. 5, in some optional embodiments, the display device 200 may include a pixel defining layer; the pixel defining layer may include a pixel defining portion 500 and a pixel opening 510; and the distance D between the edge of the touch control metal portion 312 to the edge of the pixel opening 510 toward the pixel defining portion 500 may be greater than or equal to 7.65 μm.

In some optional embodiments, the distance D from the edge of the touch control metal portion 312 to the edge of the pixel opening 510 toward the pixel defining portion 500 may refer to the distance between the orthographic projection of the touch control metal portion 312 and the bridge metal portion 321 on the substrate 100 to the edge of the orthographic projection of the pixel defining portion 500 on the substrate 100. When the distance D from the edge of the touch control metal portion 312 to the edge of the pixel defining portion 500 toward the pixel opening 510 is greater than or equal to 7.65 μm, the display effect impact of the touch control metal portion 312 and the bridge metal portion 321 on the display panel 10 can be improved.

Optionally, the display panel 10 may further include an encapsulation layer; and the encapsulation layer may be located between the pixel defining layer and the bridge layer 301. Optionally, an insulation film layer may also be disposed between the bridge layer 301 and the encapsulation layer.

Figure 12:
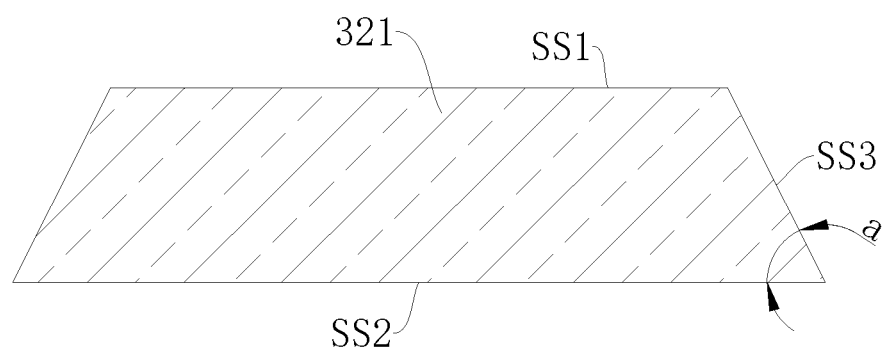
FIG. 12 illustrates a cross-sectional schematic of a bridge metal portion of a display panel according to various embodiments of the present disclosure.

Referring to FIG. 12, FIG. 12 illustrates a cross-sectional schematic of the bridge metal portion 321 of the display panel 10 according to various embodiments of the present disclosure.

In some optional embodiments, in at least the part of the touch control metal portion 312 and the bridge metal portion 321 covered by the touch control metal portion 312, the bridge metal portion 321 may have the first surface SS1 and the second surface SS2 oppositely arranged along the plane direction perpendicular to the display panel 10 and a side surface SS3 connecting the first surface SS1 with the second surface SS2. The first surface SS1 may be located on the side of the bridge metal portion 321 away from the touch control metal portion 312, and an angle a between the second surface SS2 and the side surface SS3 may be about 60°~80°.

If the angle a is excessively large and the side surface SS3 is excessively steep, when etching the metal material on the side surface SS3 and the first surface SS1, the metal residue 30' may be easily formed in the tilt angle region. When the angle a is excessively small, in order to make the distance between the first surface SS1 and the second surface SS2 reach a target value, that is, to make the first insulation portion 350 have a sufficient thickness, the extension length of the side surface SS3 may be increased. On the one hand, the size of the first surface SS1 may be excessively small, which affects the preparation of the metal layer thereon; and on the other hand, the size of the second surface SS2 may be excessively large, which results in that the size of the first insulation portion 350 is too large to be prepared.

In some optional embodiments, when the angle a is within the above-mentioned range, it can avoid that the angle a is excessively large, resulting in that the metal residue 30' is easily formed in the tilt angle region; and can also avoid that the angle a is excessively small, which may affect the preparation of the metal layer on the first surface SS1 and the preparation of the first insulation portion 350.

Optionally, the angle between the second surface and the side surface may be about 60°~80°, such that the width of the bridge metal portion can be reduced as possible while reducing the metal residue. The angle a between the second surface SS2 and the side surface SS3 may be about 70°, for example, the angle a between the second surface SS2 and the side surface SS3 may be 65° to 75°.

Figure 13:
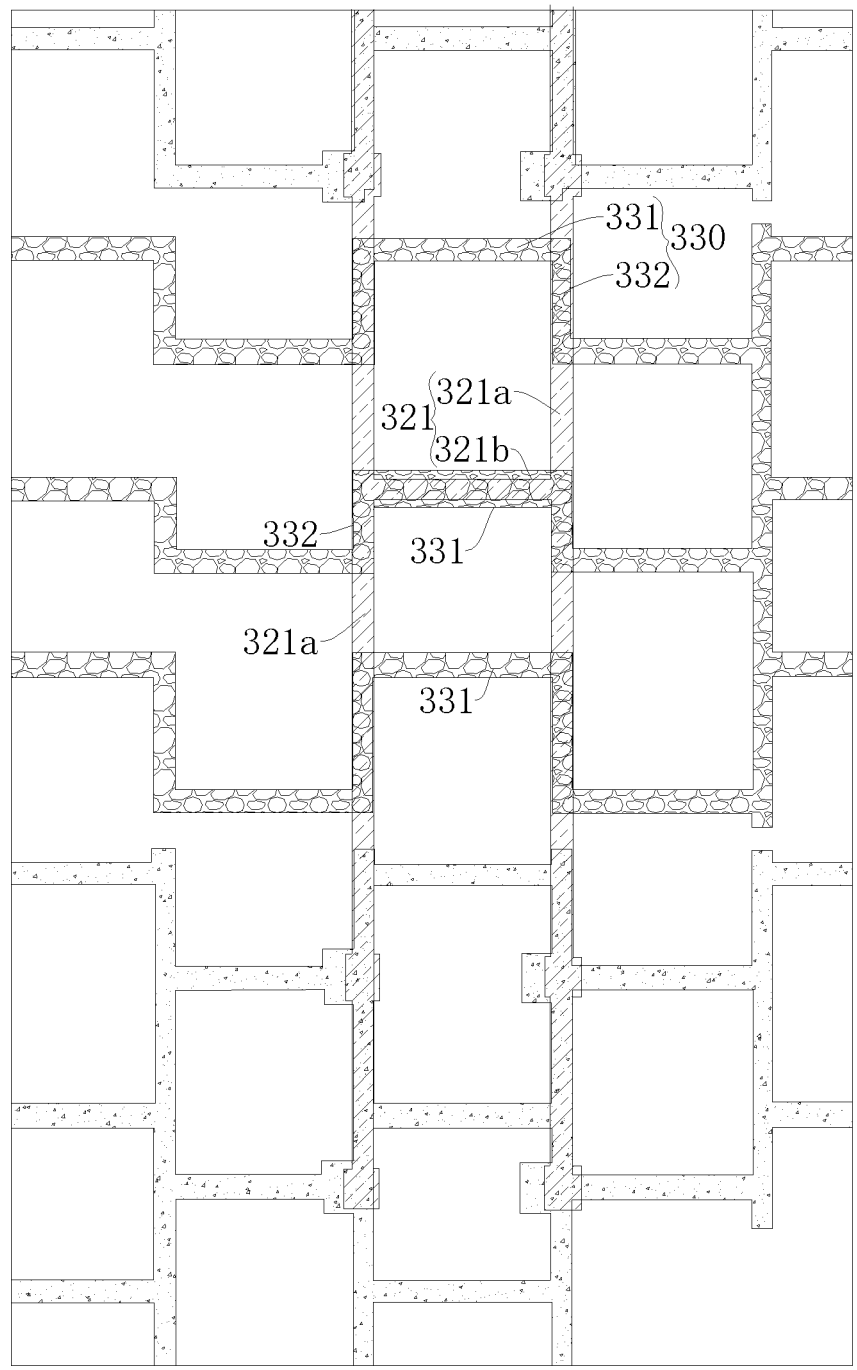
FIG. 13 illustrates another local enlarged structural schematic at a region II in FIG. 3 according to various embodiments of the present disclosure.

Referring to FIG. 13, FIG. 13 illustrates another local enlarged structural schematic at the region II in FIG. 3 according to various embodiments of the present disclosure.

As shown in FIG. 13, in other optional embodiments, the bridge metal portion 321 may include the first bridge metal portion 321*a* and the second bridge metal portion 321*b* connected between two first bridge metal portions 321*a*. The connection electrode 330 may include the first connection metal portion 331 and the second metal connection portion 332. Along the direction perpendicular to the plane where the display panel 10 is located, at least a part of the first connection metal portion 331 may cover the second bridge metal portion 321*b*.

In some embodiments, due to the existence of the second bridge metal portion 321*b*, the tilt angle region corresponding to the edge of the second bridge metal portion 321*b* may be formed on the insulation layer 302. Since at least a part of the first connection metal portion 331 cover the second bridge metal portion 321*b*, the first connection metal portion 331 may extend to these tilt angle regions. Therefore, the metal material in these tilt angle regions may not need to be etched away during the preparation of the first connection metal portion 331, and no more angular metal residue 30' may be remained. Since the metal material in these tilt angle regions does not need to be etched away, it may not cause over-etching which results in the insulation layer 302 corresponding to the tilt angle regions to be over-etched, and may also not cause the insulation layer 302 to be over-etched in the tilt angle regions to form the recessed portions which may cause the insulation layer 302 to be in danger of breaking. The integrity of the insulation layer 302 may also be improved, and the insulation layer 302 may be prevented from being broken and causing metal short circuit to affect the yield of the display panel 10, thereby improving the yield of the display panel 10.

Figure 14:
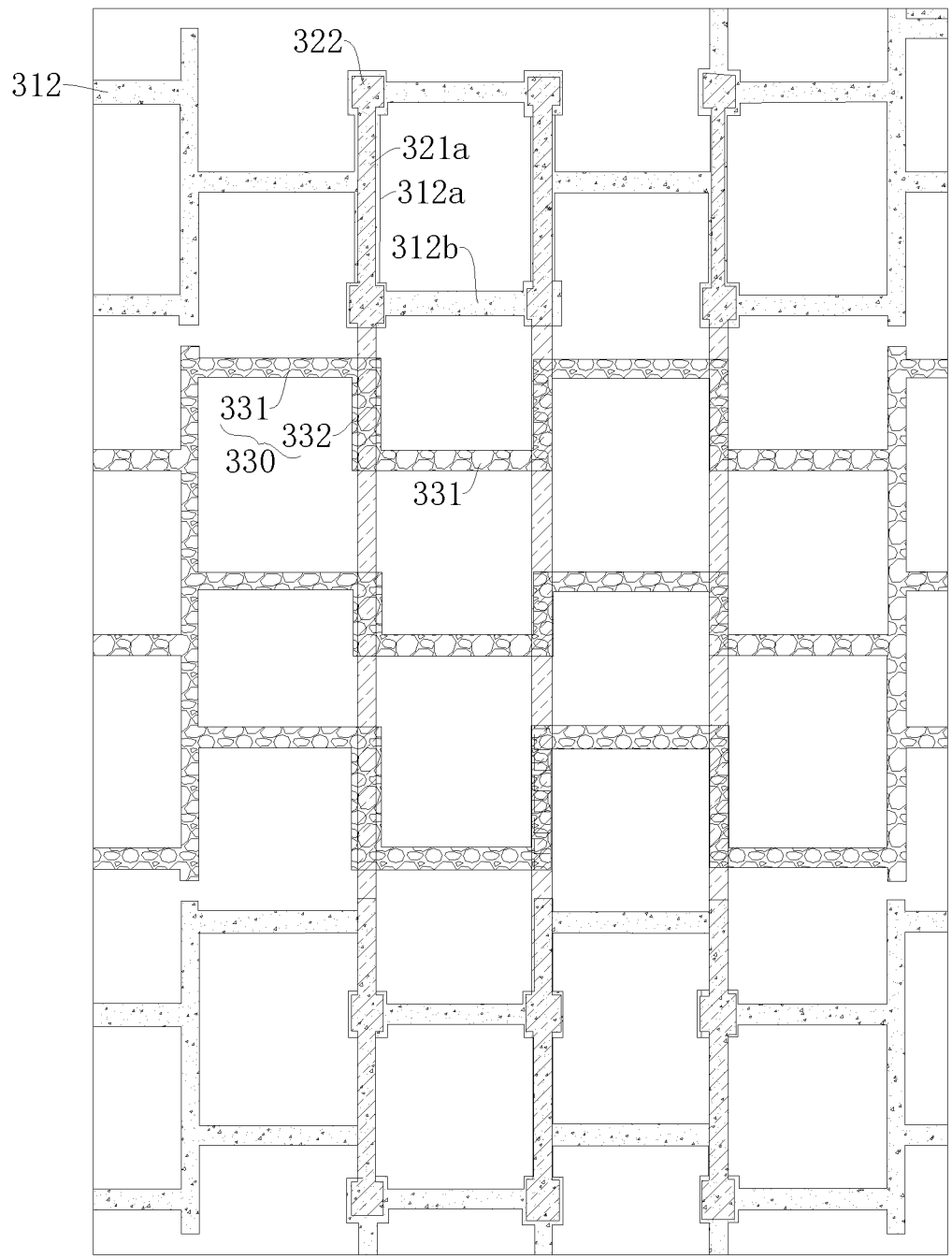
FIG. 14 illustrates another local enlarged structural schematic at a region II in FIG. 3 according to various embodiments of the present disclosure.

Referring to FIG. 14, FIG. 14 illustrates another local enlarged structural schematic at the region II in FIG. 3 according to various embodiments of the present disclosure.

As shown in FIG. 14, in some optional embodiments, the number of bridge portions 322 may be three. The three bridge portions 322 may improve the stability of the connection between two adjacent second touch control electrode blocks 310*b* and improve the connection yield of the second touch control electrode blocks 310*b*.

In the embodiment shown in FIG. 14, the bridge metal portion 321 of one bridge portion 322 may include the first bridge metal portion 321*a*. The connection electrode 330 may include the first connection metal portion 331 and the second metal connection portion 332. Along the direction perpendicular to the plane where the display panel 10 is located, at least a part of the second metal connection portion 332 may cover the first bridge metal portion 321*a*.

In some embodiments, due to the existence of the first bridge metal portion 321*a*, the tilt angle region corresponding to the edge of the first bridge metal portion 321*a* may be formed on the insulation layer 302. Since at least a part of the second metal connecting portion 332 cover the first bridge metal portion 321*a*, the second connecting metal portions 332 may extend to these tilt angle regions. Therefore, the metal material in these tilt angle regions may not need to be etched away during the preparation of the second connecting metal portions 332, and no more angular metal residue 30' may be remained. Since the metal material in these tilt angle regions does not need to be etched away, it may not cause over-etching which results in the insulation layer 302 corresponding to the tilt angle regions to be over-etched, and may also not cause the insulation layer 302 to be over-etched in the tilt angle regions to form the recessed portions which may cause the insulation layer 302 to be in danger of breaking. The integrity of the insulation layer 302 may also be improved, and the insulation layer 302 may be prevented from being broken and causing metal short circuit to affect the yield of the display panel 10, thereby improving the yield of the display panel 10.

In addition, although FIG. 14 only shows that the first metal portion 321*a* corresponding to one bridge portion 322 is covered by at least a part of the second metal connection portion 332, it may be that, in other embodiments, the first bridge metal portions 321*a* corresponding to two bridge portions 322 or three bridge portions 322 may be covered by at least a part of the second metal connection portions 332, and may also be that the first bridge metal portions 321*a* corresponding to the bridge portions 322 in other positions may be covered by at least a part of the second metal connection portions 332.

Figure 15:
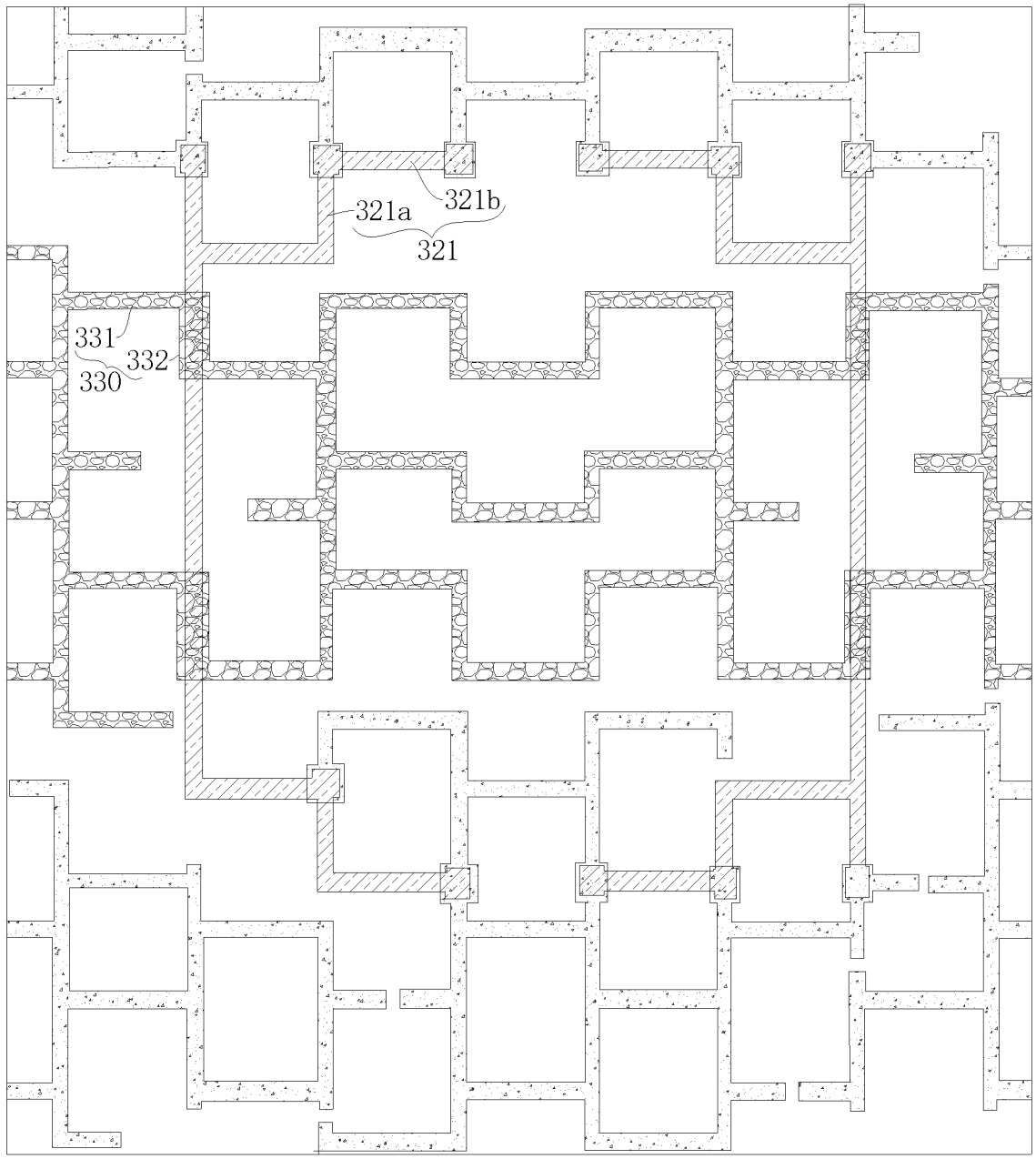
FIG. 15 illustrates another local enlarged structural schematic at a region II in FIG. 3 according to various embodiments of the present disclosure.

Referring to FIG. 15, FIG. 15 illustrates another local enlarged structural schematic at the region II in FIG. 3 according to various embodiments of the present disclosure.

As shown in FIG. 15, in some other optional embodiments, the bridge electrode 320 and the connection electrode 330 may both extend along zigzag paths, which may reduce the overlapping area of the bridge electrode 320 and the touch control electrode portion 311, reduce the risk of connecting the metal residue 30' with the touch control electrode portion 311, and improve the yield of the display panel 10.

Optionally, in the first bridge metal portion 321*a* and the second metal connection portion 332 that are overlapped with each other, at least a part of the second metal connection portion 332 may cover the first bridge metal portion 321*a*, which may further reduce the metal residue 30', reduce the fracture risk of the insulation layer 302, improve the integrity of the insulation layer 302, and prevent the insulation layer 302 from being broken and causing metal short circuit to affect the yield of the display panel 10, thereby improving the yield of the display panel 10.

Figure 16:
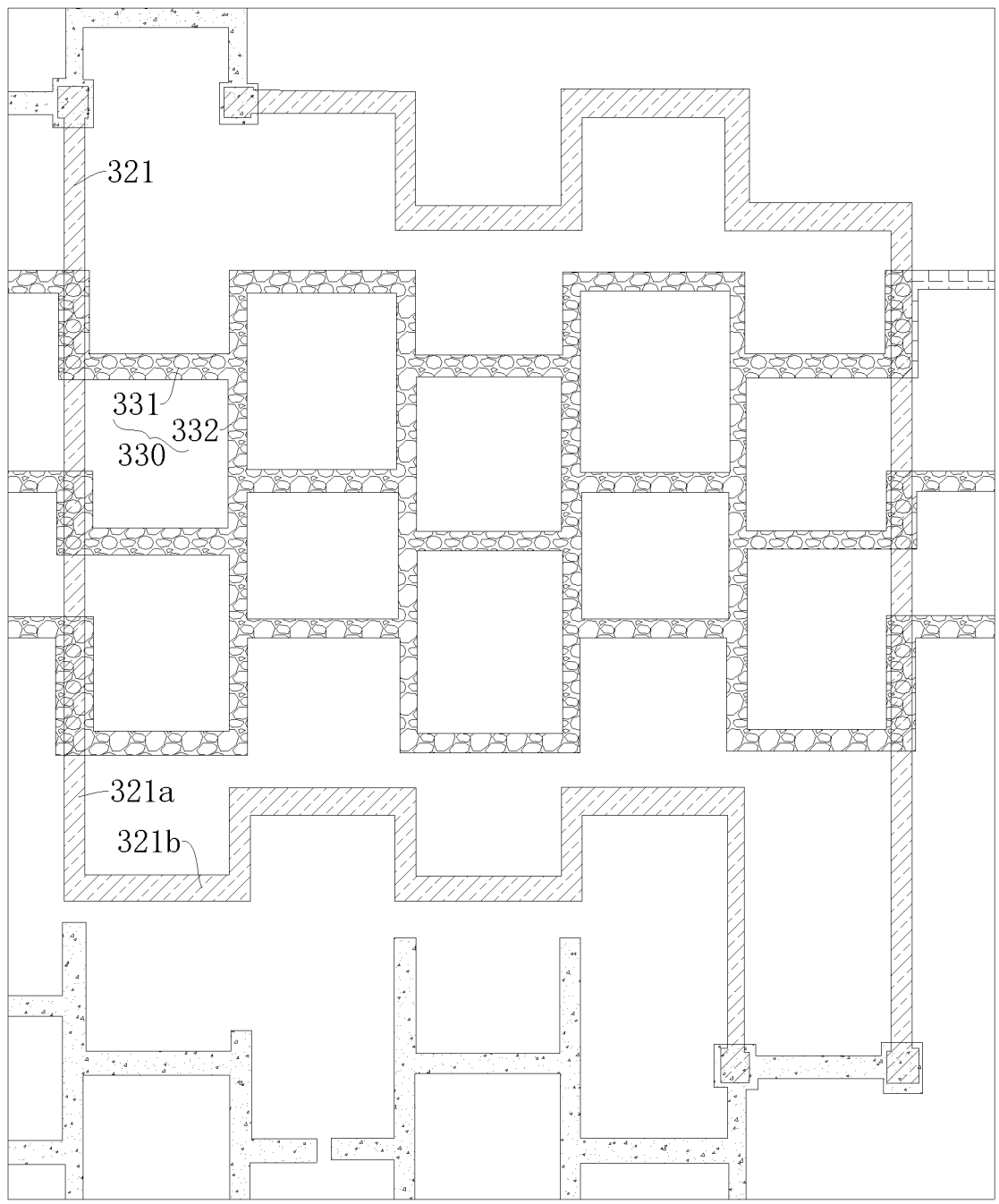
FIG. 16 illustrates another local enlarged structural schematic at a region II in FIG. 3 according to various embodiments of the present disclosure.

Referring to FIG. 16, FIG. 16 illustrates another local enlarged structural schematic at the region II in FIG. 3 according to various embodiments of the present disclosure.

As shown in FIG. 16, in some optional embodiments, the bridge via portions 322*a* at two ends of the bridge portion 322 along the second direction may be arranged in a staggered manner to reduce the overlapping area of the bridge portion 322 and the touch control electrode 310.

Optionally, in the first bridge metal portion 321*a* and the second metal connection portion 332 that are overlapped with each other, at least a part of the second metal connection portion 332 may cover the first bridge metal portion 321*a*, which may further reduce the metal residue 30', reduce the risk of 302 fracture, improve the integrity of the insulation layer 302, and prevent the insulation layer 302 from being broken and causing metal short circuit to affect the yield of the display panel 10, thereby improving the yield of the display panel 10.

Figure 17:
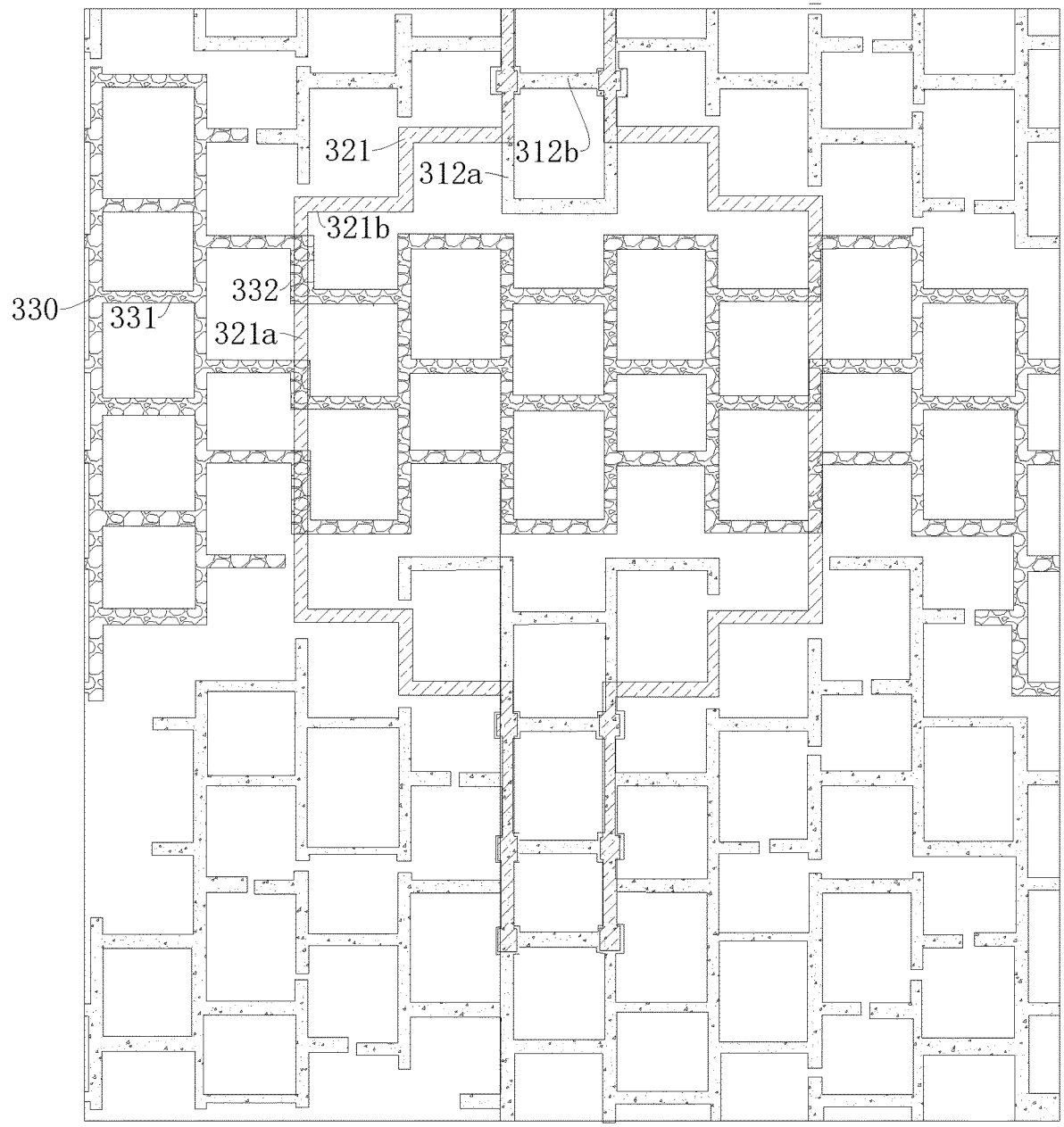
FIG. 17 illustrates another local enlarged structural schematic at a region II in FIG. 3 according to various embodiments of the present disclosure.

Referring to FIG. 17, FIG. 17 illustrates another local enlarged structural schematic at the region II in FIG. 3 according to various embodiments of the present disclosure.

As shown in FIG. 17, in some optional embodiments, the display panel 10 may further include a light-transmitting region, and the bridge metal portions 321 of the bridge electrode 320 may be arranged around the light-transmitting region, which may reduce the metal wiring density in the light-transmitting region and improve the light transmittance of the light-transmitting region.

Optionally, in the first bridge metal portions 321*a* and the second metal connection portions 332 that are overlapped with each other, at least a part of the second metal connection portion 332 may cover the first bridge metal portion 321*a*, which may further reduce the metal residue 30', reduce the fracture risk of the insulation layer 302, improve the integrity of the insulation layer 302, and prevent the insulation layer 302 from being broken and causing metal short circuit to affect the yield of the display panel 10, thereby improving the yield of the display panel 10.

Optionally, in the first bridge metal portion 321*a* and the first touch control metal portion 312*a* that are overlapped with each other, at least a part of the first touch control metal portion 312*a* may cover the first bridge metal portion 321*a*, which may further reduce the metal residue 30', reduce the risk of 302 fracture, improve the integrity of the insulation layer 302, and prevent the insulation layer 302 from being broken and causing metal short circuit to affect the yield of the display panel 10, thereby improving the yield of the display panel 10.

Figure 18:
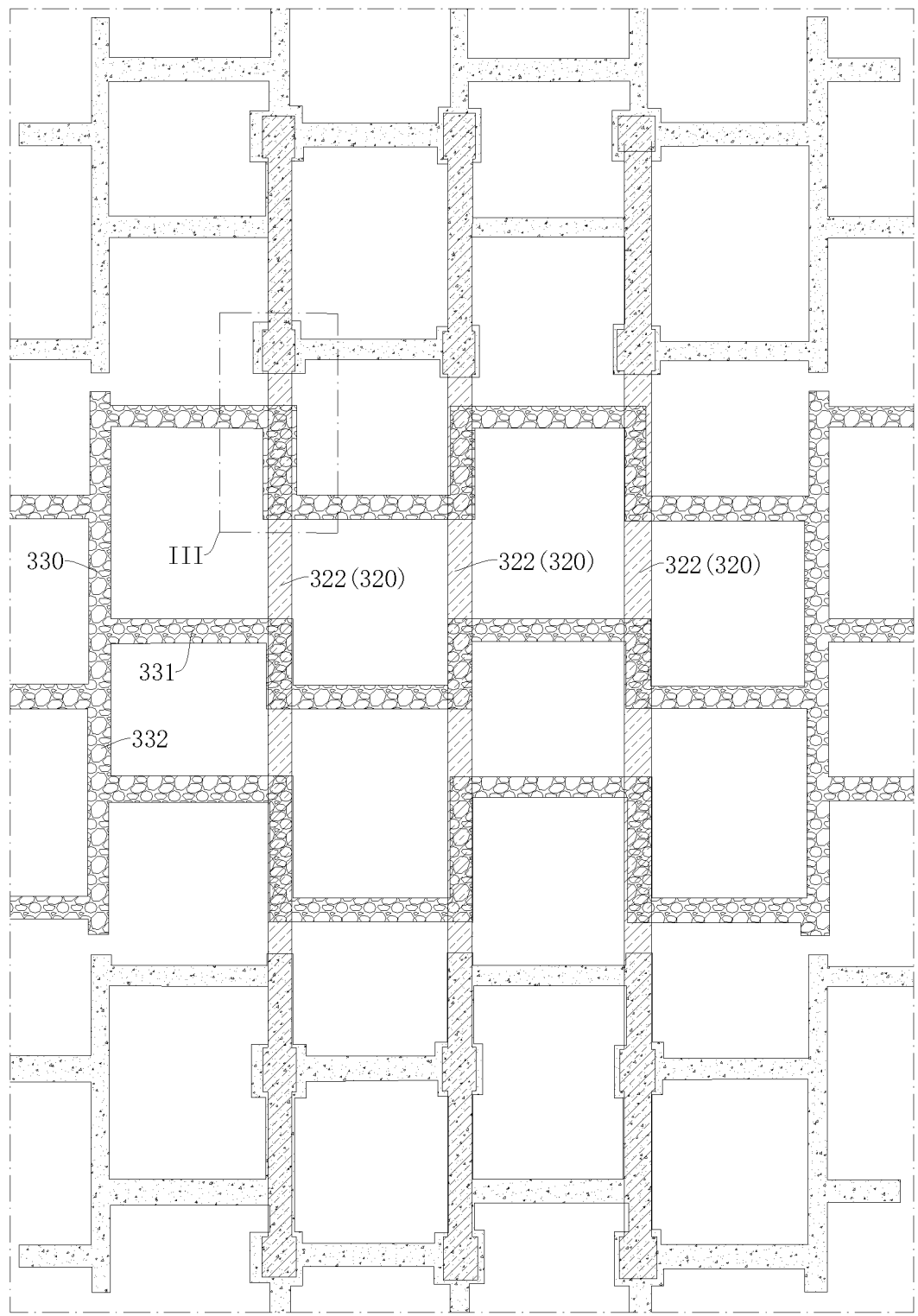
FIG. 18 illustrates another local enlarged structural schematic at a region II in FIG. 3 according to various embodiments of the present disclosure.
Figure 19:
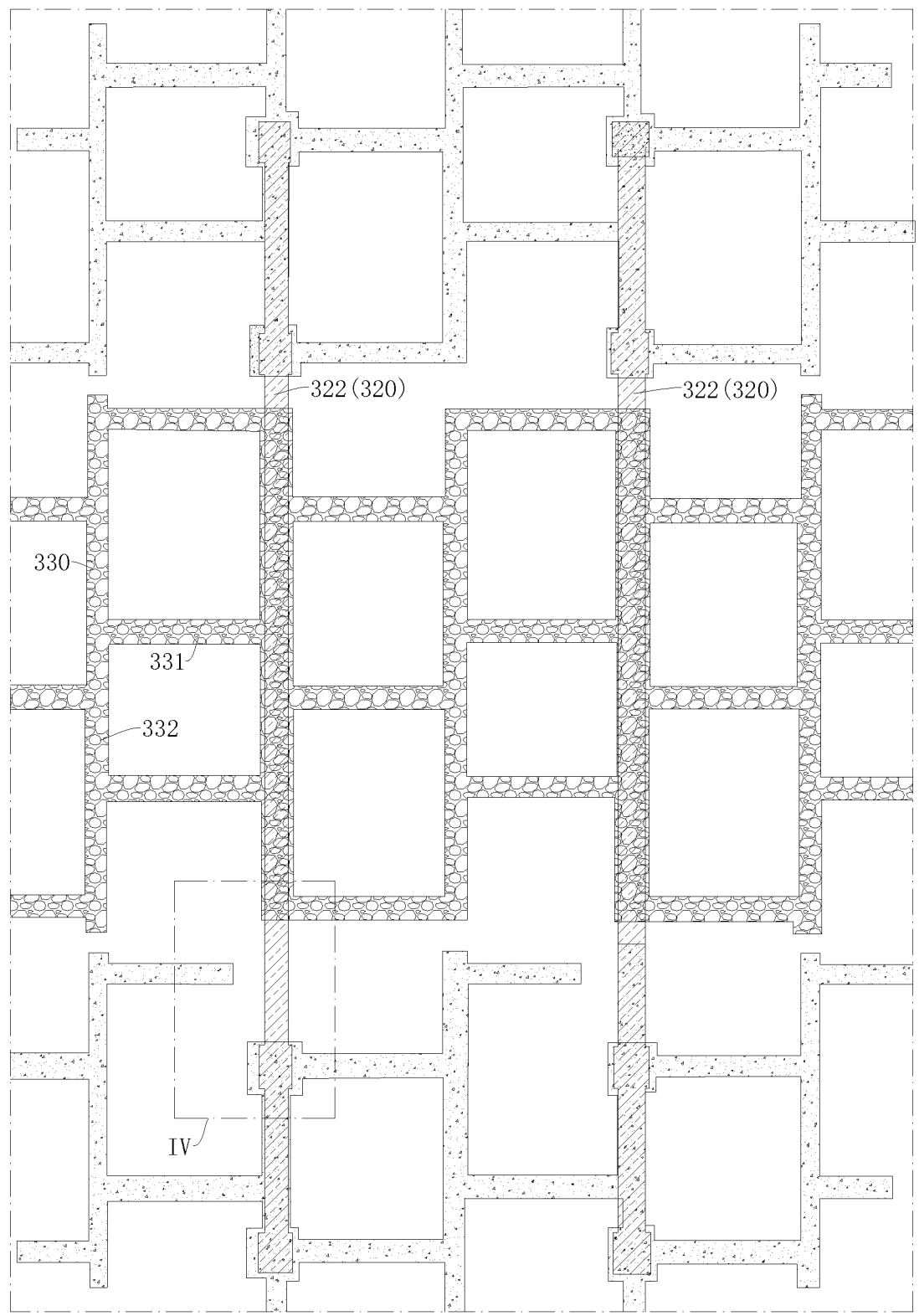
FIG. 19 illustrates another local enlarged structural schematic at a region II in FIG. 3 according to various embodiments of the present disclosure.

Referring to FIGS. 18 and 19, FIGS. 18 and 19 respectively illustrate local enlarged structural schematics at the region II in FIG. 3 according to various embodiments of the present disclosure. In the embodiment of FIG. 18, the bridge electrode 320 may include three bridge portions 322; and in the embodiment of FIG. 19, the bridge electrode 320 may include two bridge portions 322.

Figure 20:
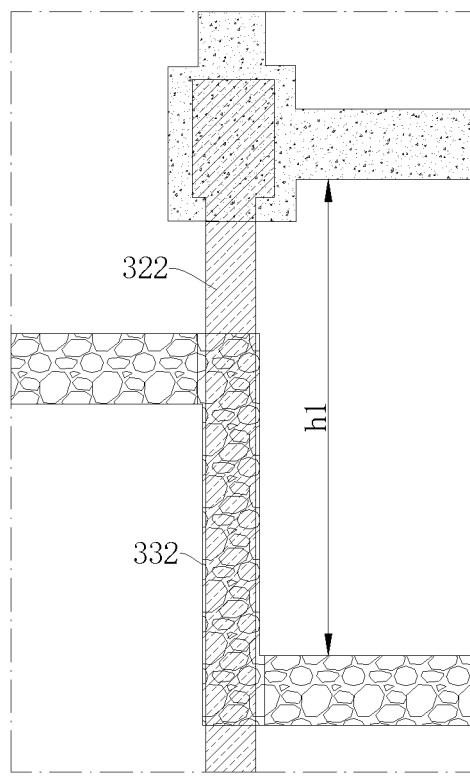
FIG. 20 illustrates a local enlarged structural schematic at a region III in FIG. 18.
Figure 21:
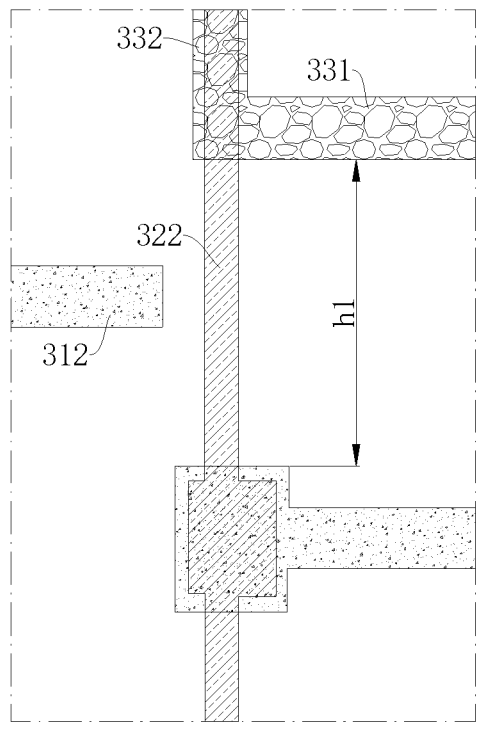
FIG. 21 illustrates a local enlarged structural schematic at a region IV in FIG. 19.

Referring to FIGS. 20 and 21, FIG. 20 illustrates a local enlarged structural schematic at the region III in FIG. 18; and FIG. 21 illustrates a local enlarged structural schematic at a region IV in FIG. 19. It can be seen from FIGS. 20 and 21 that after the extension length of the second connection metal portions 332 is reduced, the shortest path h1 of the metal residue 30' may be reduced.

According to the display panel provided by embodiments of the present disclosure, at least a part of the touch control metal portion 312 extending along the same direction covers the bridge metal portion 321, and the width of the part of the touch control metal portion 312 that extends along the same direction as the bridge metal portions 321 and overlapped with each other may be widened. In such way, the touch control metal portion 312 may extend beyond the tilt angle regions formed by the bridge metal portion 321 on the insulation layer 302, and the metal residue 30' generated in the tilt angle regions may be reduced. Moreover, since the metal in the tilt angle regions is not need to be etched, it may not cause over-etching, and the integrity of the insulation layer 302 may also be improved, which may prevent the metal short circuit due to the fracture of the insulation layer 302 from affecting the yield of the display panel 10.

Embodiments of the present disclosure also provide a display apparatus, including the display panel 10 of any one of the above-mentioned embodiments. Since the display apparatus provided by embodiments of the present disclosure includes the display panel 10 of any one of the above-mentioned embodiments, the display apparatus provided by embodiments of the present disclosure may have the beneficial effects of the display panel 10 of any one of the above-mentioned embodiments, which may not be described in detail herein.

The display apparatuses in embodiments of the present disclosure may include, but may not be limited to, mobile phones, personal digital assistants (referred to as PDAs), tablet computers, e-books, televisions, access control, smart phones, consoles and other devices with display functions.

In the display panel provided by embodiments of the present disclosure, the display panel includes the substrate, the display device, and the touch control device. The touch control device includes the bridge layer, the insulation layer, and the touch control electrode layer. The touch control electrode layer is disposed with touch control electrodes, and the bridge layer is disposed with bridge electrodes. The touch electrode portions of the touch electrodes and the bridge electrodes are at least partially overlapped with each other along the direction perpendicular to the plane of the display panel, such that the bridge electrodes can be connected to corresponding touch electrode portions. The touch control electrode portions include touch control metal portions that form a metal grid shape and are electrically connected with each other. The touch control metal portions are the wiring structure of the touch electrode portions on the display device. The bridge electrode portions include the bridge metal portions. The bridge metal portions are the wiring structure of the bridge electrodes on the display device. At least a part of the touch control metal portion extending along the same direction covers the bridge metal portion. When the touch control metal portions covering the bridge metal portions are prepared, the metal residue can be improved, which prevents the part of the metal residue from affecting the structural strength of the insulation layer due to the stress concentration of the insulation layer. The integrity of the insulation layer is improved, and the insulation layer is prevented from being broken and causing metal short circuit to affect the yield of the display panel, thereby improving the yield of the display panel.

Although the present disclosure has been described with reference to optional embodiments, various modifications may be made without departing from the scope of the present disclosure, and the components therein may be replaced with equivalents. In particular, as long as there is no structural conflict, various technical features mentioned in various embodiments may be combined in any manners. The present disclosure may not be limited to embodiments disclosed in the specification, but include all technical solutions falling within the scope of the claims.

What is claimed is:

1. A display panel, comprising:
a substrate;
a display device, disposed on the substrate; and
a touch control device, disposed on a side of the display device away from the substrate,
wherein:
the touch control device includes a bridge layer, an insulation layer, and a touch control electrode layer, which are sequentially stacked along a light exiting direction of the display panel; the bridge layer includes a plurality of bridge electrodes; the touch control electrode layer includes touch control electrodes arranged along a first direction or a second direction; and the second direction intersects the first direction;
a touch control electrode includes a touch control electrode portion, wherein along a direction perpendicular to a plane of the display panel, the touch control electrode portion at least partially overlaps a bridge electrode;
the touch control electrode portion includes a plurality of touch control metal portions formed in a metal grid shape and electrically connected with each other; the bridge electrode includes a plurality of bridge metal portions; along the direction perpendicular to the plane of the display panel, at least a part of a touch control metal portion covers at least a part of a bridge metal portion extending along a same direction as the part of the touch control metal portion;
the display device includes a pixel defining layer; and the pixel defining layer includes a pixel defining portion and a pixel opening; and
a distance from an edge of the touch control metal portion to an edge of the pixel defining portion facing toward the pixel opening is greater than or equal to 7.65 µm.

2. The display panel according to claim 1, wherein:
the insulation layer includes a first insulation portion covering the bridge metal portion, and a surface of the first insulation portion away from the substrate protrudes toward a light exiting surface of the display panel; and
an orthographic projection of the bridge metal portion on the substrate is within an orthographic projection of the first insulation portion on the substrate; and the orthographic projection of the first insulation portion on the substrate is within an orthographic projection of a corresponding touch control metal portion on the substrate.

3. The display panel according to claim 1, wherein:
the touch control electrode includes a plurality of first touch control electrode blocks; and two adjacent first touch control electrode blocks arranged along the first direction are electrically connected with each other by a connection electrode; and
the touch control electrode portion includes a connection electrode portion which is a partial structure of the connection electrode; and along the direction perpendicular to the plane of the display panel, at least a part of the connection electrode portion covers at least a part of bridge electrode extending along a same direction as the part of the connection electrode portion.

4. The display panel according to claim 3, wherein:
a connection electrode portion includes a first connection metal portion extending along the first direction and a second connection metal portion extending along the second direction; and the second connection metal portion is connected to two adjacent first connection metal portions; and
along the direction perpendicular to the plane of the display panel, at least a part of the second connection metal portion covers at least a part of the bridge metal portion extending along a same direction as the part of the second connection metal portion.

5. The display panel according to claim 4, wherein:
two adjacent first connection metal portions arranged along the second direction and two adjacent second connection metal portions arranged along the first direction enclose a single metal grid.

6. The display panel according to claim 1, wherein:
the touch control electrode includes a plurality of second touch control electrode blocks; and two adjacent second touch control electrode blocks arranged along the second direction are electrically connected with each other by the bridge electrode; and
the touch control electrode portion includes a second touch control electrode portion which is a partial structure of a second touch control electrode block; and along the direction perpendicular to the plane of the display panel, at least a part of a touch control metal portion in the second touch control electrode portion covers at least a part of the bridge metal portion extending along a same direction as the part of the touch control metal portion in the second touch control electrode portion.

7. The display panel according to claim 6, wherein:
the bridge electrode includes at least two bridge portions which extend along the second direction and are arranged along the first direction, wherein at least one bridge portion is electrically connected to one second touch control electrode block through a bridge via portion.

8. The display panel according to claim 7, wherein:
the bridge via portion includes at least two vias arranged along the second direction; and a bridge portion includes a first bridge metal portion disposed between two vias arranged along the second direction; and
along the direction perpendicular to the plane of the display panel, at least the part of the touch control metal portion in the second touch control electrode portion covers the first bridge metal portion.

9. The display panel according to claim 7, wherein:
the bridge electrode includes a second bridge metal portion extending along the second direction, and the second bridge metal portion is connected to two adjacent bridge portions; and
along the direction perpendicular to the plane of the display panel, at least the part of the touch control metal portion in the second touch control electrode portion covers the second bridge metal portion.

10. The display panel according to claim 7, wherein:
the bridge electrode further includes an auxiliary electrode portion; the auxiliary electrode portion extends along the first direction; and one end of the auxiliary electrode portion is electrically connected to at least one side of the bridge electrode along the first direction.

11. The display panel according to claim 10, wherein:
along the second direction, the auxiliary electrode portion is between the connection electrode and the bridge via portion.

12. The display panel according to claim 11, wherein:
a second touch control electrode block includes a first touch control metal portion disposed between the bridge via portion and the connection electrode along the second direction; and along the direction perpendicular to the plane of the display panel, the first touch control metal portion at least partially overlaps the bridge metal portion; and
along the second direction, the auxiliary electrode portion is between the first touch control metal portion and the connection electrode.

13. The display panel according to claim 11, wherein:
a second touch control electrode block includes a second touch control metal portion extending along the first direction; and an end of the second touch control metal portion adjacent to the bridge electrode and the bridge electrode are arranged spaced apart along the second direction.

14. The display panel according to claim 7, wherein:
the display panel includes red sub-pixels, green sub-pixels, and blue sub-pixels; and at least two bridge portions are separately disposed on two sides of a green sub-pixel along the first direction.

15. The display panel according to claim 14, wherein:
the display panel includes a plurality of repeating units arranged in an array; and
the repeating unit includes a first pixel group including a red sub-pixel, a green sub-pixel, a blue sub-pixel, a green sub-pixel, a blue sub-pixel, and a red sub-pixel, which are sequentially arranged along the second direction; and further includes a second pixel group on a side of the first pixel group along the first direction, wherein the second pixel group includes a blue sub-pixel, a red sub-pixel, a green sub-pixel, a red sub-pixel, a green sub-pixel, and a blue sub-pixel, which are sequentially arranged along the second direction; and the first pixel group and the second pixel group are arranged to be staggered along the first direction.

16. The display panel according to claim 1, wherein:
in at least the part of the touch control metal portion and the bridge metal portion covered by the part of the touch control metal portion, the bridge metal portion includes a first surface and a second surface which are oppositely arranged along the direction perpendicular to the plane of the display panel, and includes a side surface connecting the first surface with the second surface; the first surface is on a side of the bridge metal portion away from the touch control metal portion; and an angle between the second surface and the side surface is about 60°-80°.

17. The display panel according to claim 1, wherein the display panel is part of a display apparatus.

18. A display panel, comprising:
a substrate;
a display device, disposed on the substrate; and
a touch control device, disposed on a side of the display device away from the substrate, wherein:
the touch control device includes a bridge layer, an insulation layer, and a touch control electrode layer, which are sequentially stacked along a light exiting direction of the display panel; the bridge layer includes a plurality of bridge electrodes; the touch control electrode layer includes touch control electrodes arranged along a first direction or a second direction; and the second direction intersects the first direction;

a touch control electrode includes a touch control electrode portion, wherein along a direction perpendicular to a plane of the display panel, the touch control electrode portion at least partially overlaps a bridge electrode;

the touch control electrode portion includes a plurality of touch control metal portions formed in a metal grid shape and electrically connected with each other; the bridge electrode includes a plurality of bridge metal portions; and along the direction perpendicular to the plane of the display panel, at least a part of a touch control metal portion covers at least a part of a bridge metal portion extending along a same direction as the part of the touch control metal portion;

the touch control electrode includes a plurality of second touch control electrode blocks; and two adjacent second touch control electrode blocks arranged along the second direction are electrically connected with each other by the bridge electrode;

the touch control electrode portion includes a second touch control electrode portion which is a partial structure of a second touch control electrode block; and along the direction perpendicular to the plane of the display panel, at least a part of a touch control metal portion in the second touch control electrode portion covers at least a part of the bridge metal portion extending along a same direction as the part of the touch control metal portion in the second touch control electrode portion;

the bridge electrode includes at least two bridge portions which extend along the second direction and are arranged along the first direction, wherein at least one bridge portion is electrically connected to one second touch control electrode block through a bridge via portion; and the bridge electrode further includes an auxiliary electrode portion; the auxiliary electrode portion extends along the first direction; and one end of the auxiliary electrode portion is electrically connected to at least one side of the bridge electrode along the first direction.

19. A display panel, comprising:

a substrate;

a display device, disposed on the substrate; and a touch control device, disposed on a side of the display device away from the substrate, wherein:

the touch control device includes a bridge layer, an insulation layer, and a touch control electrode layer, which are sequentially stacked along a light exiting direction of the display panel; the bridge layer includes a plurality of bridge electrodes; the touch control electrode layer includes touch control electrodes arranged along a first direction or a second direction; and the second direction intersects the first direction;

a touch control electrode includes a touch control electrode portion, wherein along a direction perpendicular to a plane of the display panel, the touch control electrode portion at least partially overlaps a bridge electrode;

the touch control electrode portion includes a plurality of touch control metal portions formed in a metal grid shape and electrically connected with each other; the bridge electrode includes a plurality of bridge metal portions; and along the direction perpendicular to the plane of the display panel, at least a part of a touch control metal portion covers at least a part of a bridge metal portion extending along a same direction as the part of the touch control metal portion; and in at least the part of the touch control metal portion and the bridge metal portion covered by the part of the touch control metal portion, the touch control metal portion has a first line width B; the bridge metal portion has a second line width C; and the first line width B and the second line width C satisfy a following relationship:

$$\frac{(B-a)-(C+a)}{2} \geq 0.6 \text{ μm}$$

wherein a is an absolute value of a manufacturing tolerance.

* * * * *